United States Patent
Ihara et al.

(10) Patent No.: US 9,308,588 B2
(45) Date of Patent: Apr. 12, 2016

(54) CLAMPING DEVICE, CLAMPING METHOD, AND HOLE DRILLING METHOD

(75) Inventors: Minoru Ihara, Uozu (JP); Hideki Uchiuzo, Namerikawa (JP)

(73) Assignee: Sugino Machine Limited, Uozu-shi, Toyama (JP)

( * ) Notice: Subject to any disclaimer, the term of this patent is extended or adjusted under 35 U.S.C. 154(b) by 627 days.

(21) Appl. No.: 13/529,877

(22) Filed: Jun. 21, 2012

(65) Prior Publication Data
US 2012/0328382 A1    Dec. 27, 2012

(30) Foreign Application Priority Data
Jun. 22, 2011    (JP)  .................................. 2011-138973

(51) Int. Cl.
*B23B 49/02*    (2006.01)

(52) U.S. Cl.
CPC ........... *B23B 49/023* (2013.01); *Y10T 408/557* (2015.01); *Y10T 408/953* (2015.01)

(58) Field of Classification Search
USPC ............................................... 408/79, 80, 97
See application file for complete search history.

(56) References Cited

U.S. PATENT DOCUMENTS

| | | | |
|---|---|---|---|
| 2,839,953 A * | 6/1958 | Hanger | B23B 49/00 279/51 |
| 2,935,905 A * | 5/1960 | Winslow | 408/112 |
| 3,663,115 A | 5/1972 | Vindez et al. | |
| 4,310,269 A * | 1/1982 | Neu et al. | 408/11 |
| 4,440,529 A | 4/1984 | Henslee et al. | |
| 4,453,868 A | 6/1984 | Winslow | |
| 5,062,746 A | 11/1991 | Deremo | |
| 5,395,187 A * | 3/1995 | Slesinski et al. | 408/1 R |
| 5,482,411 A | 1/1996 | McGlasson | |
| 5,628,592 A | 5/1997 | Ringer | |
| 6,012,877 A * | 1/2000 | McCowin et al. | 408/1 R |
| 7,344,341 B2 | 3/2008 | Shemeta | |
| 8,668,410 B1 * | 3/2014 | Arana et al. | 408/113 |
| 2004/0076484 A1 | 4/2004 | Alam et al. | |
| 2004/0101376 A1 * | 5/2004 | Shemeta | 408/130 |
| 2007/0248426 A1 * | 10/2007 | Pettersson | 408/3 |
| 2008/0145160 A1 * | 6/2008 | Fritsche et al. | 408/95 |

FOREIGN PATENT DOCUMENTS

| | | |
|---|---|---|
| JP | 61-059007 | 3/1986 |
| JP | 6-27006 | 4/1994 |

(Continued)

OTHER PUBLICATIONS

Japanese Office Action for JP 2011-138973 mailed Sep. 17, 2013 (3 pages).

*Primary Examiner* — Daniel Howell
*Assistant Examiner* — Alan Snyder
(74) *Attorney, Agent, or Firm* — Merchant & Gould P.C.

(57) ABSTRACT

A clamping device can clamp a processing object and a hole drilling apparatus with high accuracy, and maintain a stable thrust force with a small size. The clamping device clamps the hole drilling device that drills a hole through the processing object. The clamping device includes: a clamp plate drive unit disposed at the front end portion, on the processing object side, of the hole drilling apparatus; a clamp plate that advances and retreats along the machining shaft of the hole drilling apparatus in association with the clamp plate drive unit; a bush that advances and retreats integrally with the clamp plate, and a collet whose diameter is expanded by the advancing and retreating of the bush to be engaged with a jig plate for position definition of a drill (hole drilling tool) for drilling a hole through the processing object.

1 Claim, 11 Drawing Sheets

(56) References Cited

FOREIGN PATENT DOCUMENTS

| | | |
|---|---|---|
| JP | 2007-092943 | 4/2007 |
| JP | 4162957 | 8/2008 |
| JP | 4374315 | 9/2009 |
| WO | WO 2004/024376 | 3/2004 |
| WO | WO 2010/018340 A2 | 2/2010 |

\* cited by examiner

FIG. 3 CLAMPED STATE

UNCLAMPED STATE

CLAMPED STATE

CLAMPED STATE

CLAMPING DEVICE, CLAMPING METHOD, AND HOLE DRILLING METHOD

CROSS REFERENCE TO RELATED APPLICATION

This application claims the priority of Japanese Patent Application No. 2011-138973, filed on Jun. 22, 2011, the entire specification, claims and drawings of which are incorporated herewith by reference.

BACKGROUND OF THE INVENTION

1. Field of the Invention

The present invention relates to a clamping device that clamps a hole drilling apparatus for drilling a hole through a processing object, a clamping method, and a hole drilling method.

2. Description of the Related Art

Conventionally, in case of drilling a hole through a processing object by a hole drilling apparatus, in general, first, the processing object and the hole drilling apparatus are held by a clamping device to obtain a stable state of a drilling position and processing attitude, and then drilling work on the processing object is performed.

As a hole drilling apparatus for drilling a hole through a processing object, there are known drilling apparatus (for example, see JP 4162957 B1 (Claim 1)) capable of drilling a hole through a processing object while clamping a hole drilling tool at a guide block, and devices that insert a protrusion formed at the front end thereof into a guide sleeve and rotate the protrusion to thereby stop the guide sleeve by engagement with the inner surface of a template to be able to perform hole drilling and cutting processing (see JP 4374315 B1 (FIG. 1)).

Further, as a method for clamping a hole drilling apparatus with a processing object, there are known processing methods and collets for performing hole drilling while clamping a collet at the front end of a device (tool) with a jig plate (template) or a processing object having a hole or a recession by expanding the collet diameter (for example, see U.S. Pat. No. 5,628,592 A1).

The collet described in U.S. Pat. No. 5,628,592 A1 is a member for fixing a hole drilling apparatus with a processing object. In this case, in order to fix the hole drilling apparatus with the processing object with high accuracy, using a collet, it is essential to fix the collet and the hole drilling apparatus in a stable state.

Further, the collets and the hole drilling apparatus described in JP 4162957 B1, JP 4374315 B1, and U.S. Pat. No. 5,628,592 A1 have a problem that an air clamp mechanism is essential for expanding the diameter of a collet to realize stable operation. Further, for the collet and a hole drilling apparatus, it is necessary to adjust movement of the clamp mechanism by having quantitative fluid act on the clamp mechanism, which causes a problem of making the apparatus itself complicated and large.

SUMMARY OF THE INVENTION

In this situation, the present invention has been developed to solve these problems, and an object of the invention is to provide a clamping device, a clamping method, and a hole drilling method that enable clamping between a processing object and a hole drilling apparatus with high accuracy and maintaining a stable thrust force with a small size of the clamping device.

In order to solve the above problems, in a first aspect of the invention, provided is a clamping device that defines a position of a hole drilling tool attached to a machining shaft of a hole drilling apparatus for drilling a hole through a processing object, the position being defined at a positioning hole formed through a jig plate, the clamping device including: a clamp plate attached to a front end portion of the hole drilling apparatus to be able to advance and retreat along the machining shaft; a clamp plate drive unit for advancing and retreating the clamp plate; a bush having a tapered portion whose diameter is expanded to be larger on a front side than on a rear side, the bush being arranged at the clamp plate such as to rotatably support the hole drilling tool; and a collet having a tapered portion whose diameter is reduced to be smaller on a rear end side than on a front end side, the collet suiting the tapered portion of the bush and being fixed to the front end portion of the hole drilling apparatus and being inserted into the positioning hole, wherein the position of the hole drilling tool is defined at the positioning hole by that the clamp plate drive unit retreats the bush to engage the tapered portion of the bush with the tapered portion of the collet.

With such a structure, on the clamping device, when the clamp plate drive unit drives, the clamp plate advances and retreats along the machining shaft of the hole drilling apparatus, accompanying the clamp plate drive unit. The bush integrally moves with the clamp plate, and the diameter thereof is thereby expanded by the tapered portion of the collet. Then, the collet is engaged with the positioning hole of the jig plate for defining the position of the hole drilling tool and held by the jig plate. Thus, the position of the bush inside the collet and the position of the hole drilling tool inside the bush are defined at a predetermined position.

The clamping device is arranged such that the clamp plate drive unit is disposed at the front end portion, on the processing object side, of the hole drilling apparatus; the clamp plate and the bush are moved along the machining shaft, accompanying the clamp plate drive unit; and the bush thereby holds the jig plate. Accordingly, the clamp plate drive unit can be disposed in the vicinity of the jig plate.

Thus, the clamp plate drive unit that generates a holding force for holding the jig plate by the collet is disposed at the front end portion, on the processing object side, of the hole drilling apparatus and in the vicinity of the bush, the jig plate, and the collet. Accordingly, the jig plate and the processing object can be fixed in a stable state and in a state of accurate position defining, and downsizing of the clamping device and the hole drilling apparatus can be attained.

As a result, the clamping device can firmly hold a processing object in a stable state even at a narrow place. Accordingly, the hole drilling apparatus can perform hole drilling with high accuracy and improve the machining accuracy.

In a second aspect of the invention, provided is the clamping device in the first aspect, wherein the clamp plate drive unit includes a piston cylinder device having; a first piston cylinder device having a first cylinder and a first piston that is arranged inside the first cylinder to be able to advance and retreat; and a second piston cylinder device having a second cylinder and a second piston that is arranged inside the second cylinder to be able to advance and retreat, wherein the second piston cylinder device is provided with an air supply flow path for supplying air, supplied from an air supply source, into the second cylinder.

With such a structure, the clamp plate drive unit is formed by the piston cylinder device with two serially connected piston cylinder mechanisms that are the first piston cylinder device and the second piston cylinder device, and it is thereby possible to attain downsizing and weight reducing of the whole piston cylinder device and increase the clamp force.

In a third aspect of the invention, provided is the clamping device in the second aspect, wherein the first cylinder is formed by: a first cylinder plate forming one half of a cylinder case of the first cylinder; a second cylinder plate forming another half of the cylinder case of the first cylinder; and a first cylindrical member arranged inside the first cylinder plate and the second cylinder plate, and wherein the second cylinder is formed by: the second cylinder plate forming one half of a cylinder case of the second cylinder; a third cylinder plate forming another half of the cylinder case of the second cylinder; and a second cylindrical member arranged inside the second cylinder plate and the third cylinder plate.

With such a structure, the first cylinder and the second cylinder share the second cylinder plate that forms respective one halves of cylinder cases of the first cylinder and the second cylinder, and it is thereby possible to decrease the number of components and the number of man-hours for assembly works to attain reduction in cost and weight, and attain a small size and a light weight of the whole device.

In a fourth aspect of the invention, provided is the clamping device in the first aspect, wherein the clamp plate drive unit includes: a connecting rod whose one end portion is connected with the clamp plate; and a cam lever rotatably connected with another end portion of the connecting rod, wherein the cam lever is rotationally operated to advance and retreat the bush through the connecting rod and the clamp plate.

With such a structure, when the cam lever is rotationally operated, the clamp plate drive unit can advance and retreat the bush through the connecting rod and the clank plate, and it is thereby possible to decrease the number of components and make the structure of the whole device simple.

In a fifth aspect of the invention, provided is a clamping method for clamping the jig plate holding the processing object, using the clamping device in any one of the first to third aspects, the clamping method including: a drive process for driving the clamp plate drive unit to advance and retreat the clamp plate drive unit; a clamp plate moving process for moving the clamp plate to advance and retreat the clamp plate drive unit, accompanying the advancing and retreating drive by the clamp plate drive unit; a bush moving process for moving the bush to advance and retreat the bush, accompanying the advancing and retreating movement of the clamp plate; a collet diameter expanding process for expanding the diameter of the collet by the advancing and retreating movement of the bush; and a clamping process for clamping the jig plate by inserting the collet into the positioning hole.

With such a structure, by the clamping method, when the clamp plate drive unit is driven to advance and retreat in the drive process, the clamp plate and the collet moves advancing and retreating in the clamp plate moving process and the bush moving device, and accompanying this, the diameter of the collet is expanded (the collet diameter expanding process), corresponding to the movement of the bush, and the collet is inserted into the positioning hole of the jig plate. Thus, the collet clamps the jig plate integrated with the processed object (clamping process).

In such a manner, in the clamping method, the clamp plate drive unit moves advancing and retreating in the drive process, and the clamp plate and the collet thereby move in association with each other to clamp the collet. Accordingly, it is possible to downsize the whole clamping device with a simple structure.

In a sixth aspect of the invention, provided is the clamping method in the fifth aspect, wherein the drive process includes: a first cylinder air supply process for feeding air, supplied from an air supply source, to inside the first cylinder; a first piston moving process for moving the first piston in the first cylinder to advance and retreat the first piston; a second cylinder air supply process for feeding air supplied from the air supply source or air fed to the first cylinder, into the second cylinder; and a second piston moving process for moving the second piston in the second cylinder.

With such a structure, in the clamping method, two pistons, namely, the first piston and the second piston are moved in the first piston moving process and the second piston moving process, and it is thereby possible to make the clamp force strong with a simple structure.

In a seventh aspect of the invention, provided is a hole drilling method for drilling a hole through the processing object, clamping the jig plate that holds the processing object by a use of the clamping device according to any one of claims 1 to 3, including: a drive process for driving the clamp plate drive unit to advance and retreat the clamp plate drive unit; a clamp plate moving process for moving the clamp plate to advance and retreat the clamp plate, accompanying the advancing and retreating drive by the clamp plate drive unit; a bush moving process for moving the bush to advance and retreat the bush, accompanying the advancing and retreating movement of the clamp plate; a collet diameter expanding process for expanding the diameter of the collet by the advancing and retreating movement of the bush; a clamping process for clamping the jig plate by inserting the collet into the positioning hole; and a hole drilling process for drilling a hole through the processing object by holding the hole drilling tool for processing the processing object by a holding unit, and moving and rotating the holding unit.

With such a structure, in the hole drilling method, the processing object and the hole drilling apparatus are firmly clamped in the clamping process, and then the holding unit holding the hole drilling tool is moved and rotated in the hole drilling process to drill a hole through the processing object. It is thereby possible to improve the accuracy of hole drilling.

A clamping device, a clamping method, and a hole drilling method according to the present invention make it possible to clamp a processing object and a hole drilling apparatus with high accuracy, and maintain a stable thrust force with a small size of the apparatus.

BRIEF DESCRIPTION OF THE DRAWINGS

FIGS. 8A and 8B are Y-Y cross-sectional view related to FIG. 7, wherein FIG. 8A shows the clamp lock mechanism in an unclamped state, and FIG. 8B shows the clamp lock mechanism in a clamped state;

DETAILED DESCRIPTION OF THE PREFERRED EMBODIMENTS

Figure 1:
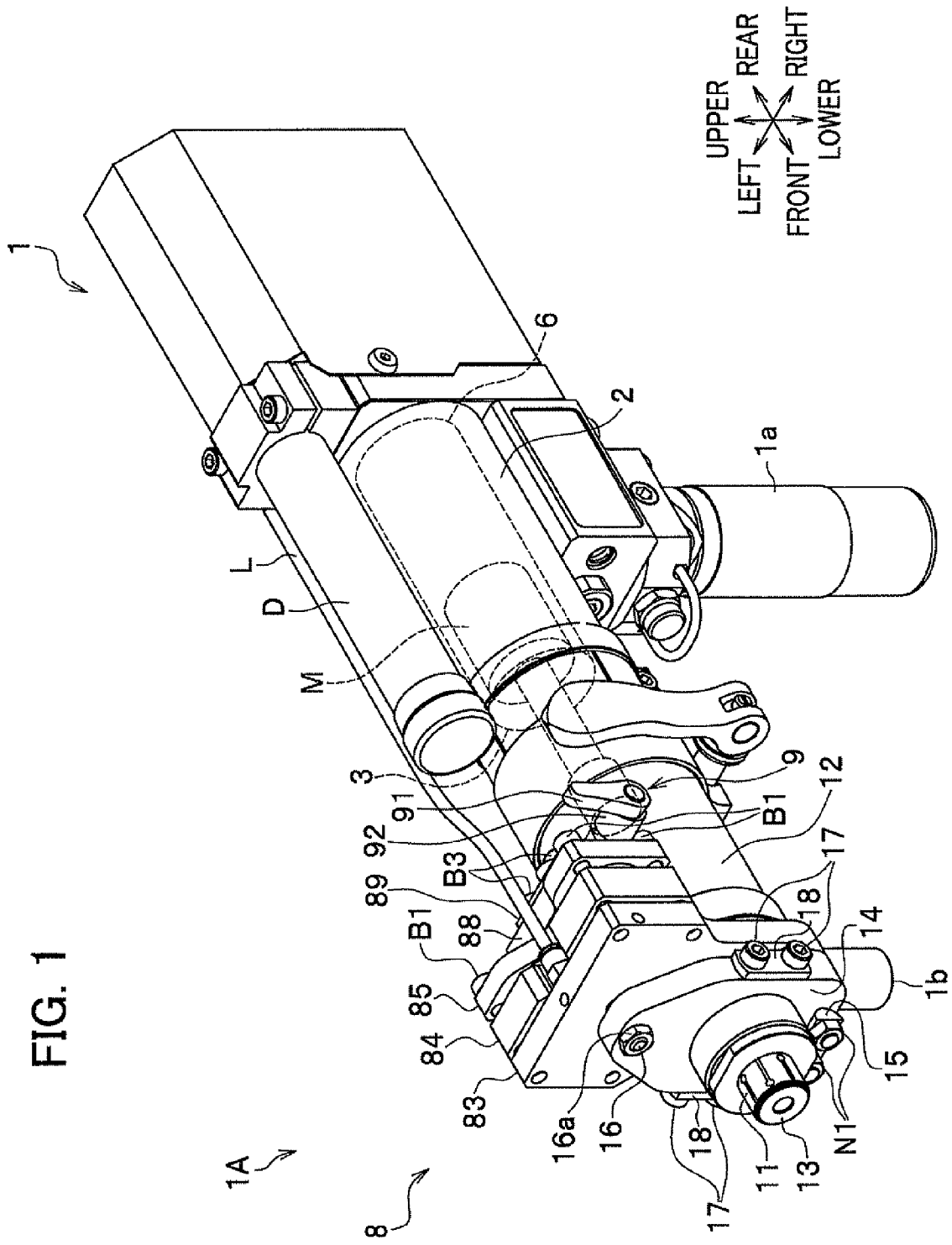
FIG. 1 is a perspective view showing an example of a hole drilling apparatus having a clamping device in an embodiment of the present invention.

A clamping device 1A in an embodiment according to the present invention will be described below, referring to the drawings.

The clamping device 1A is, for example, a device that clamps a device, such as a hole drilling apparatus 1, itself and a jig plate P (template) fitted to a processing object W (see FIG. 2) to be processed by the hole drilling apparatus 1. The apparatus provided with the clamping device 1A is not limited to the hole drilling apparatus 1 and can be any device that performs work, having a later-described bush 13 be inserted inside a hole or a recession formed through or on the jig plate P, the processing object W, or the like. As an example of embodiment of the clamping device 1A according to the present invention, a case of using the clamping device 1A on the hole drilling apparatus 1 will be described below.

Structure of Hole Drilling Apparatus

As shown in FIG. 1, the hole drilling apparatus 1 can be any machining device that processes the processing object W (see FIG. 2) by rotating a tool. The hole drilling apparatus 1 will be described below, taking an example of a drill device having a hole drilling tool, such as a drill T (see FIG. 3). The hole drilling apparatus 1 is a device that processes the processing object W by rotating and advancing and retreating (reciprocal moving) the drill T (hole drilling tool), using a drive force of hydraulic pressure, air pressure, an electrical motor or the like. The hole drilling apparatus 1 will be described below, taking an example of a drilling apparatus that rotates and reciprocally moves the drill T by compressed air.

For convenience, description will be made such that, with reference to a state that an operator grips a grip 1a, defined are the front side (front end side) by the side where the drill T is attached, the rear side by the opposite side, the lower side by the side where the grip 1a is fixed, and the upper side by the opposite side.

Structure of Hole Drilling Apparatus

Figure 2:
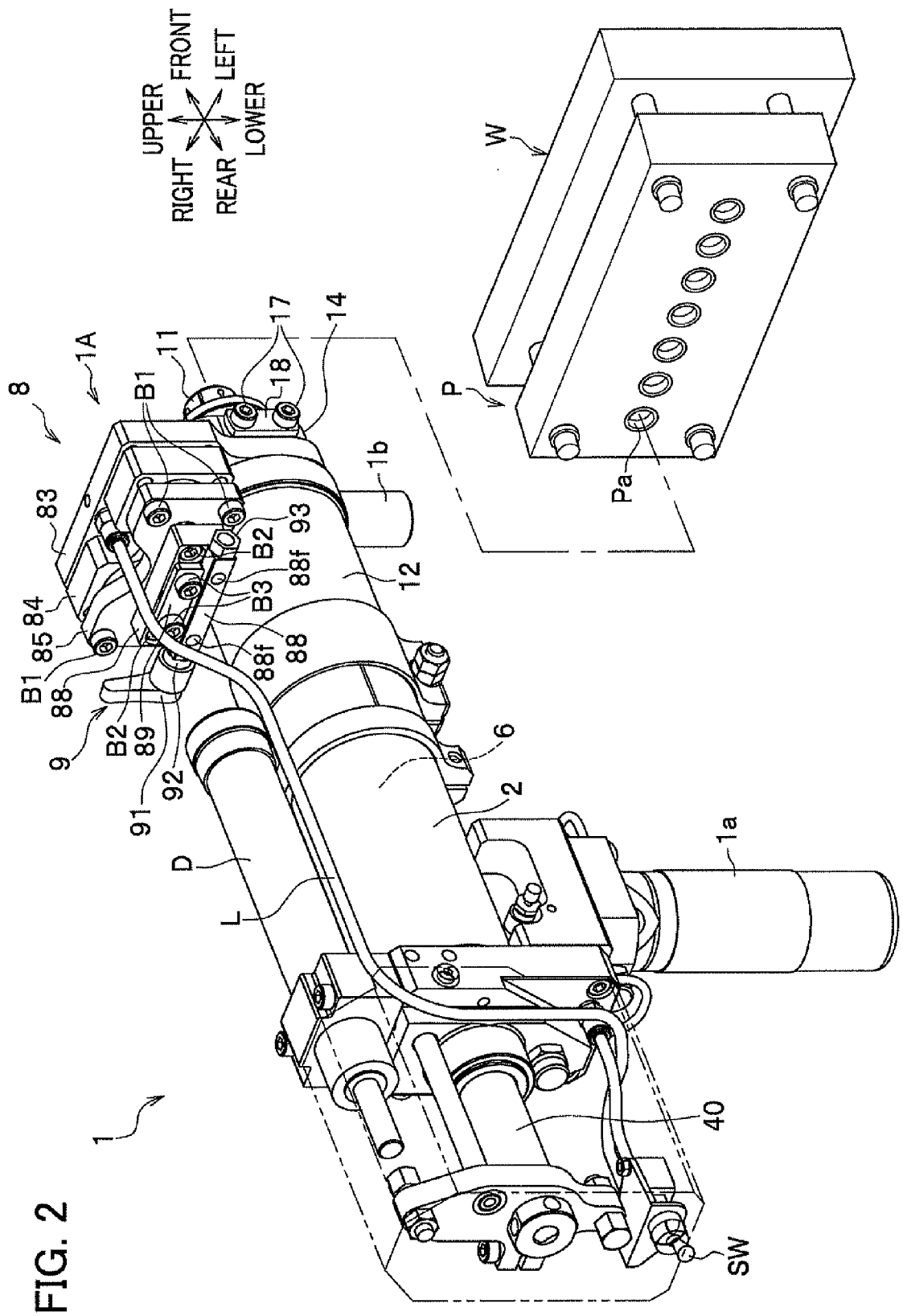
FIG. 2 is a diagram showing a state that the cover member of the hole drilling apparatus in the embodiment of the invention is removed, and is a perspective view from the rear side.

As shown in FIG. 2, the hole drilling apparatus 1 is a hand tool with which, an operator (not shown) grips the grip 1a and defines the position of the front end part of the hole drilling apparatus 1 by inserting a collet 11 of the clamping device 1A into a positioning hole Pa, which is formed through a jig plate P (template) for position defining, and performs drilling work by locking through expanding the outer diameter of the collet 11. The hole drilling apparatus 1 is a device that rotates and feeds the drill T (see FIG. 3) to drill a hole through the processing object W.

The hole drilling apparatus 1 mainly includes a body 2 substantially in a cylindrical shape, a ram 3 (see FIG. 1) arranged inside the body 2 to be able to advance and retreat, a center bar 40 extended posterior to the ram 3, an advance and retreat mechanism 6 for advancing and retreating the ram (see FIG. 3), the drill T (see FIG. 3) advanced and retreated by the advance and retreat mechanism 6, a holding unit 5 (see FIG. 3) for holding the drill T and advancing and retreating the drill T integrally with the ram 3, a main-shaft motor M (see FIG. 1) for rotating the drill T through the holding unit 5, and a nose piece 12 that is arranged at the front of the body 2 to cover the drill T, the clamping device 1A being fitted to the nose piece 12.

Structure of Body

The body 2, shown in FIG. 1, is a housing that houses therein the ram 3 reciprocally moving (feed and return), the advance and retreat mechanism 6, the main shaft motor M, and the like. In the body 2, arranged are an air cylinder chamber (not shown) for advancing and retreating the ram 3 by compressed air from an air supply source, not shown. A hydraulic damper D is mounted above the body 2. A grip 1a having an air supply opening (not shown) communicated with an air pressure chamber (not shown) formed on the outer circumference of the ram 3 is fixed under the body 2.

As shown in FIG. 2, the center bar 40 is formed by a shaft rod member that is screwed into the rear end portion of the ram (see FIG. 1) and is extended such as to close the rear end portion of the ram 3. The center bar 40 is provided with an air exhaustion path, an air exhaustion outlet, a flow path for motor, and the like.

Structures of Ram and Hydraulic Damper

As shown in FIG. 1, the ram 3 is a substantially cylindrical member for reciprocally moving the drill T by compressed air through the holding unit 5 (see FIG. 3), and is housed in the body 2 to be able to advance and retreat. The ram 3 is slidably supported through a seal member (not shown) by the front end portion, the central portion, and the rear end portion of the body 2. Further, an expanded diameter portion in a flange shape (not shown) is formed at center of the outer circumferential portion of the ram 3, wherein the diameter expansion portion slides forward and backward inside the body 2 by compressed air.

The hydraulic damper D is, for example, arranged above the body 2 to adjust the feed speed of the ram 3.

Structure of Advance and Retreat Mechanism

As shown in FIG. 1, the advance and retreat mechanism 6 is configured, for example, by an air cylinder mechanism that advances and retreats the ram 3, the holding unit 5 (see FIG. 3), and the drill T (see FIG. 3) by compressed air, which is supplied from the compressed air supply source (not shown) to the air cylinder chamber (not shown) formed between the outer circumferential portion of the ram 3 and the inner circumferential portion of the body 2.

Structure of Main Shaft Motor

Figure 3:
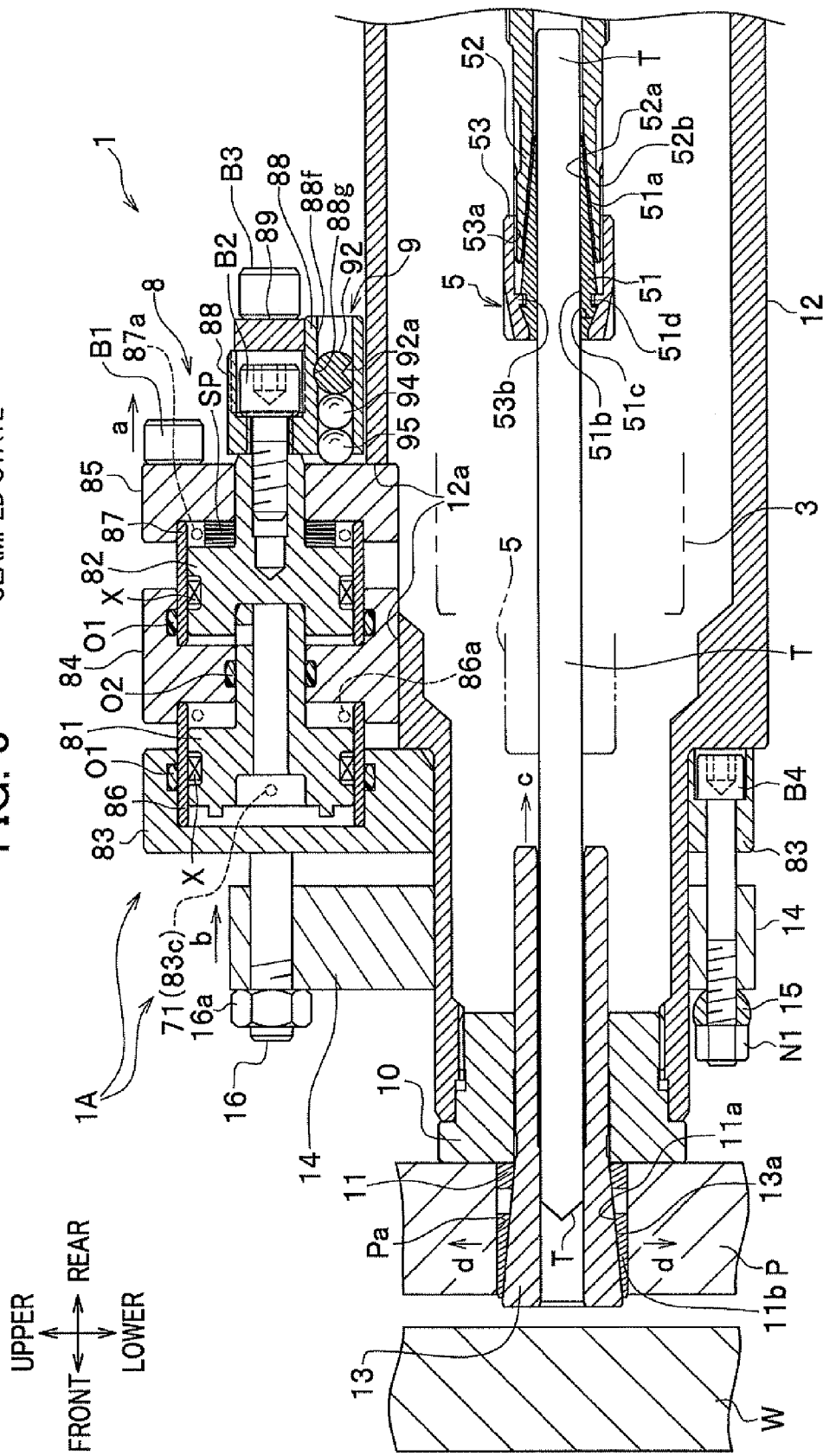
FIG. 3 is an enlarged cross-sectional view of the front end portion of the clamping device in the embodiment of the invention.

The main shaft motor M is a motor for rotating the drill T, and is arranged, for example, by an air motor that rotates by compressed air supplied from the compressed air supply source (not shown) to the air motor chamber (not shown). The front end portion of the main shaft (not shown) of the main shaft motor M is, as shown in FIG. 3, connected to the drill T through the holding unit 5 holding the drill T.

Structure of Air Flow Path

As shown in FIG. 2, an air flow path L is a flow path for supplying compressed air, which is supplied from the compressed air supply source, not shown, to a piston cylinder device 8 (clamp plate drive unit 80A), and is formed by an air hose. The piston cylinder device 8 linearly drives by compressed air from the air flow path L thereof. The air flow path L is dedicated to piston cylinders and performs clamping and unclamping of the collet 11 by ON/OFF of a mechanical valve switch.

Structure of Holding Unit

As shown in FIG. 3, the holding unit 5 is a connection member for holding the drill T and transmitting the rotation of the main shaft motor M (see FIG. 1) to the drill T. The holding unit 5 is provided with a drill collet 51 for holding the drill T, a spindle 52 formed at the front end portion of the main shaft (not shown), the drill collet 51 being inserted inside the spindle 52, and a collet nut 53 for fixing the drill collet 51 to the spindle 52.

Structures of Drill Collet, Spindle, and Collet Nut

As shown in FIG. 3, the drill collet 51 is a substantially cylindrical member to which the rear end surface side of the drill T is attached, and has a tapered diameter expansion portion 51a on the outer circumferential surface thereof, wherein the diameter expansion portion 51a is inserted inside an openness expansion portion 52a formed with expanded openness at the inner tube portion of the spindle 52. The drill collet 51 is provided with the openness expansion portion 51a, a drill holding hole 51b for having the drill T penetrate through a plurality of slits 51c in a notched groove shape notched from the rear end portion of the drill collet 51 toward the front side, and an annular engagement groove 51d.

The collet nut 53 is a fixing tool for fixing the drill collet 51 to the spindle 52. The collet nut 53 is provided with an internal thread portion 53a to be thread-engaged with the external thread portion 52b of the spindle 52, in a state that the head portion of the drill collet 51 is fitted inside the internal thread portion 53a, and an engagement-stop recessed portion 53b to be engaged with an engagement groove 51d formed on the outer circumferential portion of the drill collet 51.

The spindle 52 is a substantially cylindrical member formed at the front end portion of the main shaft (not shown). The spindle 52 is provided with an openness expansion portion 52a for fixing the drill T to the drill collet 51 by, at the time when the collet nut 53 is thread-engaged with the external thread portion 52b, pressing the diameter expansion portion 51a of the drill collet 51 toward the central axis and thus reducing the diameter of the diameter expansion portion 51a. The spindle 52 is further provided with the above-described external thread portion 52b for connecting the collet nut 53, the drill collet 51, and the drill T by thread engagement with the internal thread portion 53a.

Structure of Nose Piece

As shown in FIG. 1, the nose piece 12 is a cover member arranged at the front portion of the body 2. The nose piece 12 covers the holding unit 5 (see FIG. 3), the drill T (see FIG. 3), and the rear end side of the bush guide 10. The clamping device 1A is fitted on the outer circumferential portion of the nose piece 12. The nose piece 12 is, on the upper outer circumferential portion thereof, provided with a piston-cylinder engagement portion 12a on which mounted are the lower end portions of the first cylinder plate 83, the second cylinder plate 84, and the third cylinder plate 85 of the piston cylinder device 8. A dust collection pipe 1b is installed on the lower outer circumferential portion of the nose piece 12. A clamp lock mechanism 9 is arranged on the upper outer circumferential portion of the nose piece 12 and posterior to the piston cylinder device 8.

Structure of Clamping Device

As shown in FIG. 3, in performing hole drilling processing of the processing object W by the hole drilling apparatus 1, the clamping device 1A holds the jig plate P by expanding the diameter of the collet 11 having been inserted for position defining in the positioning hole Pa of the jig plate P. The clamping device 1A is disposed at the front end of the hole drilling apparatus 1 and is driven when compressed air is supplied to the piston cylinder device 8, and also is driven when the clamp lock mechanism 9 is switched to be driven by manual operation of a later-described lock lever 91. The clamping device 1A is provided with the piston cylinder device 8 with an air piston cylinder mechanism, a clamp plate 14 that moves associated with the piston cylinder device 8 and advances and retreats along the principal axis (machining axis) of the hole drilling apparatus 1, a clamp bolt 16 (connecting rod) for supporting the piston cylinder device 8 and the clamp plate 14, a lock bolt B4 for restricting the movement of the clamp plate 14, the first cylinder plate 83, a lock bar fixing nuts N1 that are thread-engaged with the front-end-side external thread portion of the lock bolts B4 penetrated through the clamp plate 14 and the lock bar 15, the lock bar 15 sandwiched between the lock bar fixing nuts N1 and the clamp plate 14, the lock bolts B4 being penetrated through the lock bar 15, the bush 13 connected to the clamp plate 14, clamp plate connection tools 18 (see FIG. 9) for connecting the clamp plate 14 and the bush 13, and the collet 11 that is engaged with the jig plate P by expansion of the diameter thereof by advance and retreat of the clamp plate connection tools 18 and the bush 13.

Structure of Piston Cylinder Device

Figure 4:
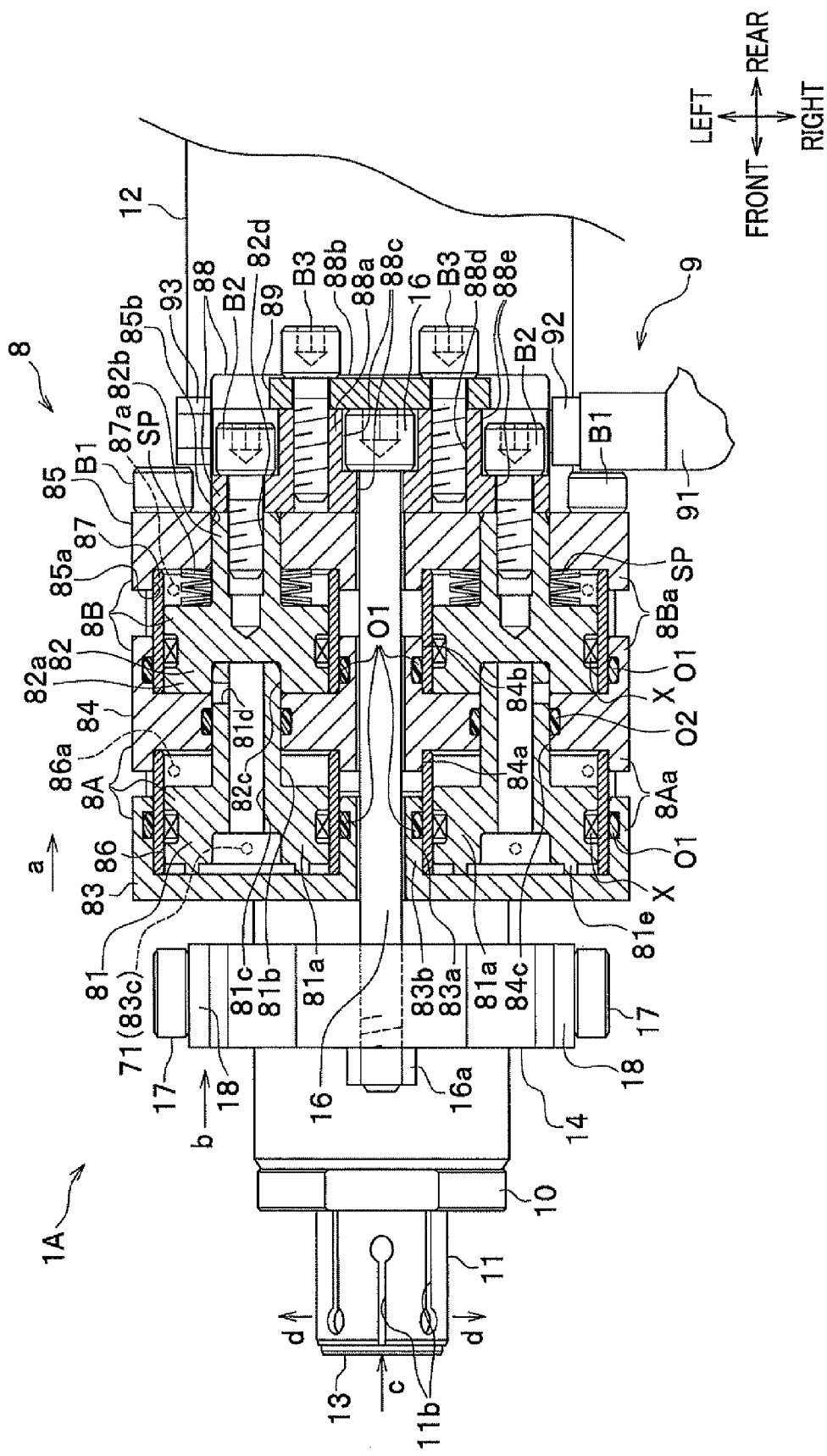
FIG. 4 is an enlarged cross-sectional view of the piston cylinder device, in an unclamped state, of the clamping device in the embodiment of the invention.

As shown in FIGS. 3 and 4, the piston cylinder device 8 (clamp plate drive unit 80A) is an air cylinder mechanism that advances and retreats a left/right pair of a first piston 81 and a second piston 82 by compressed air, and thereby advances and retreats, with interposition of a piston fixing bar 88 and the clamp bolt 16, the clamp plate 14 which moves integrally with the bush 13 for expanding the diameter of the collet 11. The piston cylinder device 8 is arranged on a piston cylinder engagement portion 12a provided at the front end upper portion of the substantially cylindrical nose piece 12.

The piston cylinder device 8 is provided with a first piston cylinder device 8A and a second piston cylinder device 8B, which are described later, spring members SP, a piston fixing bar 88, a clamp bolt presser 89, the clamp bolt 16, cylinder plate fixing bolts B1 (see FIG. 4), piston fixing bolts B2, clamp bolt press fixing bolts B3, seal members O1 and O2, and packings X.

Figure 5:
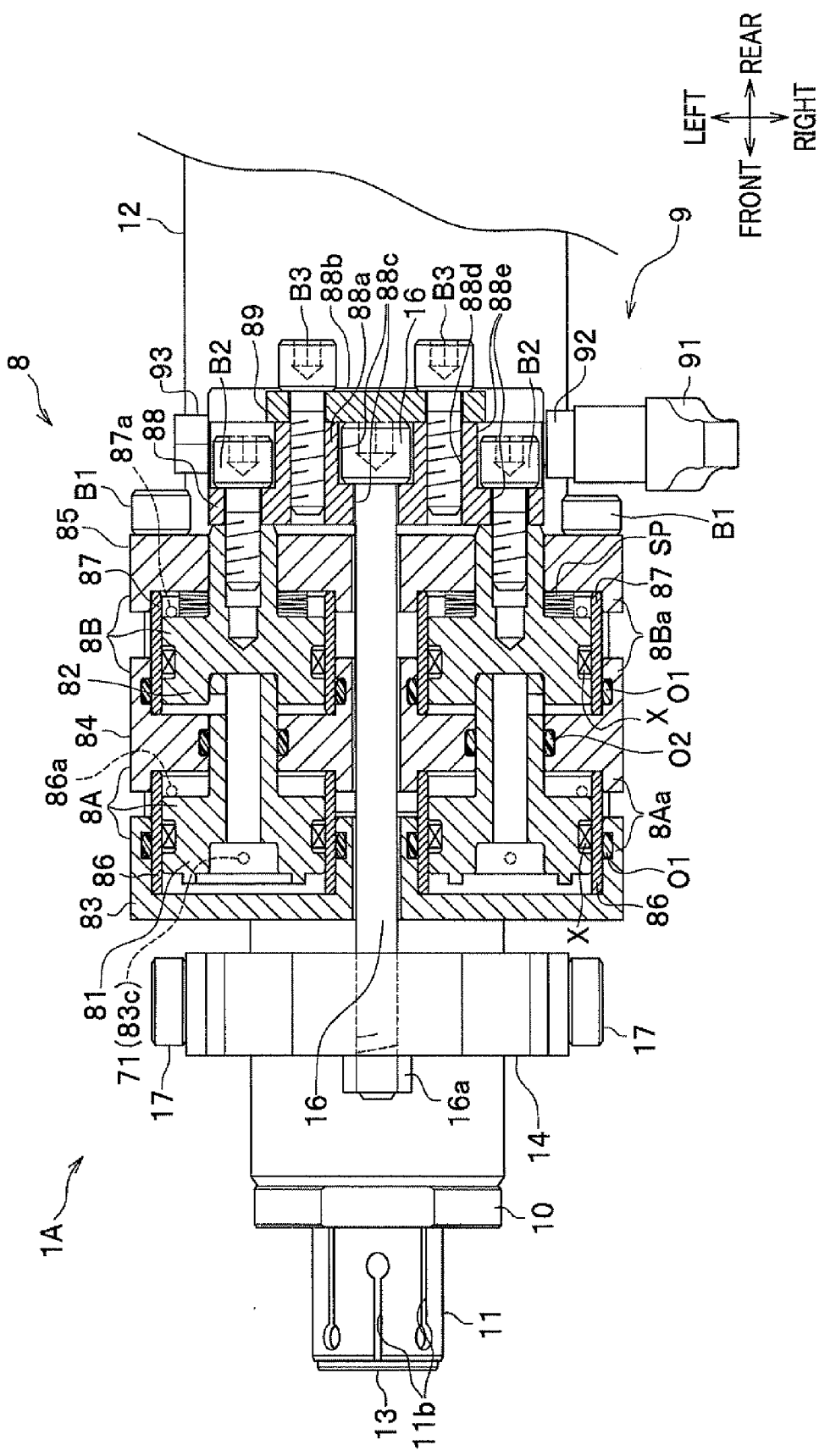
FIG. 5 is an enlarged horizontal cross-sectional view of the piston cylinder device, in a clamped state, of the clamping device in the embodiment of the invention.

As shown in FIGS. 4 and 5, the piston cylinder device 8 is provided with the left/right pair of combinations of the first piston cylinder device 8A and the second piston cylinder device 8B along the front/rear direction, with the clamp bolt 16 at the symmetry center in a horizontal cross-sectional view. The respective component members of the piston cylinder devices 8 are disposed substantially left/right symmetric with the clamp bolt 16 at the center and integrally driven. Accordingly, description will be made only on one side, as appropriate, and description on the other side will be omitted.

Structure of First Piston Cylinder Device

As shown in FIG. 4, the first piston cylinder device 8A is a piston cylinder mechanism disposed in a vicinity (on the front end side of the nose piece 12) of the clamp plate 14, wherein the later-described respective members are disposed left/right symmetrically with the clamp bolt 16 at the center. The first piston cylinder device 8A mainly includes a left/right pair of first pistons 81 disposed in a fixed state with respect to the nose piece 12, first cylinders 8Aa disposed on the circumferential portions of the left/right pair of the first pistons 81, and first cylindrical members 86 arranged between the first cylinders 8Aa and the first pistons 81.

Structure of First Piston

The first pistons 81 are pistons which are disposed left and right with the clamp bolt 16 at the center, and are in the same shape, and operate the same. The whole first pistons 81 are formed substantially in a cylindrical shape. Each of the first pistons 81 has a piston portion 81a that is a thick plate substantially in a ring shape, a cylindrical piston rod portion 81b, a hollow portion 81c forming a part of the supply path of compressed air, a side hold 81d continuous with the hollow portion 81c, and a protrusion portion 81e protruding from the end surface on the side of the clamp plate 14, and is arranged inside the first cylinder 8Aa. When compressed air is supplied into the first cylinders 8Aa, the first pistons 81 are pressed by the compressed air, thereby press the second pistons 82 against the spring members SP, and move together the same.

As shown in FIG. 4, each of the piston portion 81a is a portion that receives the air pressure of compressed air supplied from a supply inlet 83c communicating with an air supply flow path 71 disposed at the front end portion of the first piston 81, and is formed in a thick circular disc shape. A packing X is attached on the outer circumferential surface of the piston portion 81a, and the piston portion 81a is arranged inside the first cylindrical member 86 movably along the piston rod portion 81b.

Each of the piston rod portions 81b functions as: a tube path for supplying compressed air, the compressed air being supplied from the air supply flow path 71 into the first cylinder plate 83, into the third cylinder plate 85 on the side of the second piston 82; a connection portion for connecting the first piston 81 and the second piston 82; and a guide portion for guiding the movement of the piston portion 81a. The piston rod portion 81b is inserted movably inside the inner wall of the second cylinder plate 84 attached with the seal member O2, and the rear end portion thereof is fitted inside the connection hole 82c of the second piston 82.

The hollow portion 81c and the side hole 81d form a tube path where the compressed air flows. The hollow portion 81c is formed along the center line of the first piston 81. The side hole 81d is formed such as to communicate with the hollow portion 81c and the space between the second cylinder plate 84 and the second piston 82.

Structure of First Cylinder

As shown in FIG. 4, the first cylinders 8Aa are members that are disposed around the circumferential portions of the left/right pair of first pistons 81, and form a cylinder case for housing the first pistons 81, allowing the first pistons 81 to advance and retreat. The first cylinders 8Aa are formed mainly by the first cylinder plate 83 forming the one (front side) half cylinder case of the first cylinders 8Aa, the second cylinder plate 84 forming the other (rear side) half cylinder case of the first cylinders 8Aa, and the first cylindrical members 86 arranged inside the first cylinder plate 83 and the second cylinder plate 84.

Structure of First Cylinder Plate

The first cylinder plate 83 is a member in a thick plate shape provided with rear side openings 83a into which the first cylindrical members 86 and the first pistons 81 are inserted through the seal members O1, and is arranged to be able to advance and retreat along the clamp bolt 16. The first cylinder plate 83 forms the half cylinder case on the front end side of the first pistons 81. The first cylinder plate 83 is provided with a pair of the rear side openings 83a formed on the end surface on the first piston 81 side, a shaft cylindrical portion 83b in which the clamp bolt 16 is inserted to be able to advance and retreat, air supply flow paths 71 for supplying compressed air, supplied from the air supply source (not shown), into the first cylinders 8Aa, and supply inlets 83c connected with the air supply flow paths 71, wherein the supplied compressed air is ejected from the air supply flow paths 71 through the supply inlets 83c into the first cylinders 8Aa.

The air supply flow paths 71 are flow paths connected with an air flow path L (see FIG. 1), and are arranged such as to communicate with the supply inlets 83c in the rear side openings 83a from the outer surface of the first cylinder plate 83.

Structure of Second Cylinder Plate

As shown in FIG. 4 the second cylinder plate 84 is a member that is in a thick plate shape and serves as both a half cylinder case of the first pistons 81 on the base end side of the first pistons 81, and the half cylinder case of the second pistons 82 on the front end side of them. The second cylinder plate 84 is provided with first openings 84a in which the first cylindrical members 86 and the first pistons 81 are inserted, and second openings 84b in which later-described second cylindrical members 87 and the second pistons 82 are inserted. The second cylinder plate 84 is provided with a left/right pair of the first openings 84a formed such as to be open at the end face on the front side, a left/right pair of the second openings 84b formed such as to be open at the end face on the rear side, and piston rod penetration holes 84c continuous with the respective first openings 84a and the respective second openings 84b.

Structure of Second Piston Cylinder Device

The second piston cylinder device 8B is arranged on the rear side of the above-described first piston cylinder device 8A, and is a left/right pair of piston cylinder mechanisms arranged such as to be pressed backward by the first piston cylinder device 8A to be driven integrally with the first piston cylinder device 8A. The second piston cylinder device 8B mainly includes the second pistons 82, the second cylinders 8Ba inside which the second pistons 82 are arranged to be able to advance and retreat, second cylindrical members 87 arranged between the second cylinders 8Ba and the second pistons 82, spring members SP for automatic return of the first pistons 81 and the second pistons 82, air outlets 87a for letting out air and pressure in the second cylinders 8Ba, a piston fixing bar 88 for closing second piston rod penetration holes 85b, and a clamp bolt presser 89 fixed to the piston fixing bar 88.

Structure of Second Piston

As shown in FIG. 4, each of the second pistons 82 is pressed by compressed air supplied from the hollow portion 81c of the first piston 81, thus retreats against the spring force of the spring member SP together with the first piston 81, and when the air and pressure are let out, the second piston 82 advances by the spring force of the spring member SP together with the first piston 81. Each of the second piston 82 has a piston portion 82a substantially in a ring shape of a thick plate, a piston rod portion 82b in a cylindrical shape, the connection hole 82c, and a fastening hole 82d with which a piston fixing bolt B2 is thread-engaged. The second piston 82 is arranged inside the second cylinder 8Ba to be able to advance and retreat.

Structure of Second Cylinder

The second cylinders 8Ba are provided with the second cylinder plate 84 forming a front side (one) half cylinder case of the second cylinders 8Ba, the third cylinder plate 85 forming a rear side (the other) half cylinder case of the second cylinder 8Ba, the second cylindrical members 87 arranged inside the second cylinder plate 84 and the third cylinder plate 85, the piston fixing bar 88, and the clamp bolt presser 89.

Structure of Third Cylinder Plate

The third cylinder plate 85 is provided with front side openings 85a which house the second cylindrical members 87, the piston portions 82a of the second pistons 82, and spring members SP, and second piston rod penetration holes 85b in which piston rod portions 82b are inserted.

Structure of First Cylindrical Member and Second Cylindrical Member

The first cylindrical member 86 and the second cylindrical members 87 are cylindrical members which are fitted on the outer circumferences of the piston portions 81a of the first pistons 81 and the outer circumferences of the piston portions 82a of the second pistons 82. The first cylindrical members 86 are arranged extending from inside the rear side openings 83a of the first cylinder plates 83 to inside the first openings 84a of the second cylinder plate 84. The portions of the respective first cylindrical member 86, the portions being on the side of the second cylinder plate 84, are provided with respective air outlets 86a for exhausting air in the first cylinders 8Aa. The second cylindrical members 87 are arranged extending from inside the second openings 84b of the second cylinder plate 84 to inside the front side openings 85a of the third cylinder plate 85. The portions of the second cylindrical members 87, the portions being on the side of the third cylinder plate 85, are provided with respective air outlets 87a for letting out air in the second cylinders 8Ba.

Structure of Spring Member

The above-described spring members SP are loosely fitted to the piston rod portions 82b of the second pistons 82. The spring members SP are formed by elastic members that are assembled such that the front end portions thereof are in press contact with the rear end surfaces of the respective rear portions of the piston portions 82a of the second pistons 82, and the rear end portions thereof are in press contact with the bottom surfaces of the respective front side openings 85a of the third cylinder plate 85. The spring members SP have spring forces that press-return the first pistons 81 and the second piston 82 toward the front side, and are formed by, for example, a plurality of disc springs, a helical compression spring, or the like.

Structure of Piston Fixing Bar

As shown FIG. 4, the piston fixing bar 88 is a member having; a function as a lid member that closes the second piston rod penetration holes 85b of the third cylinder plate 85 in which the piston rod portions 82b of the left/right pair of second pistons 82 are respectively inserted; a function as a connection member for connecting the left and right second pistons 82 with the clamp bolt 16 for the same movement; and a function as a base table for installing the clamp lock mechanism 9 that switches the state of the clamping device 1A between the clamped state that the collet 11 is fitted inside a positioning hole Pa manually by pressing the third cylinder plate 85, and the unclamped state that the collet 11 is loosely fitted to the positioning hole Pa.

Figure 8A:
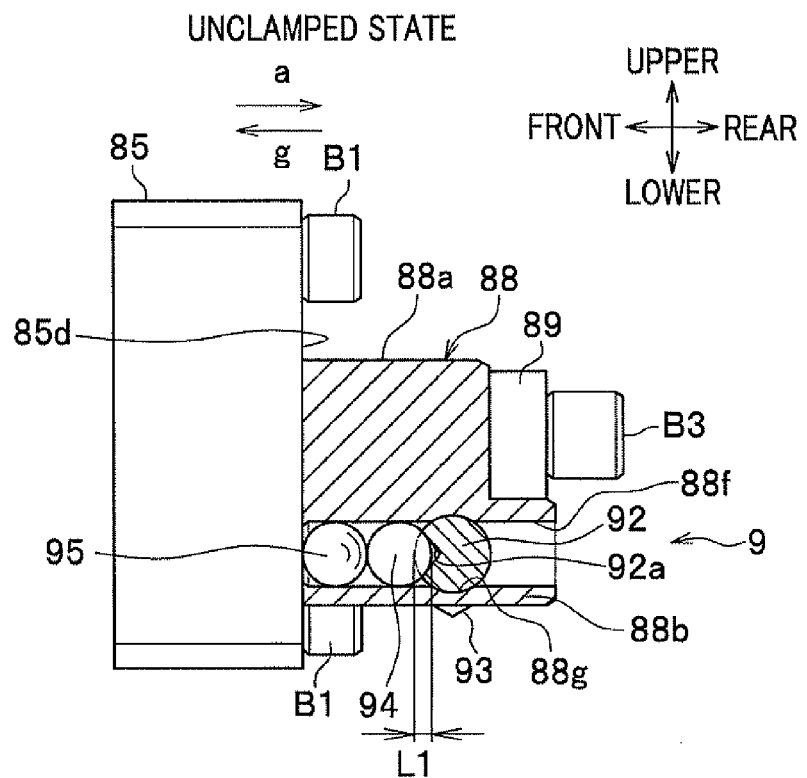
Figure 8B:
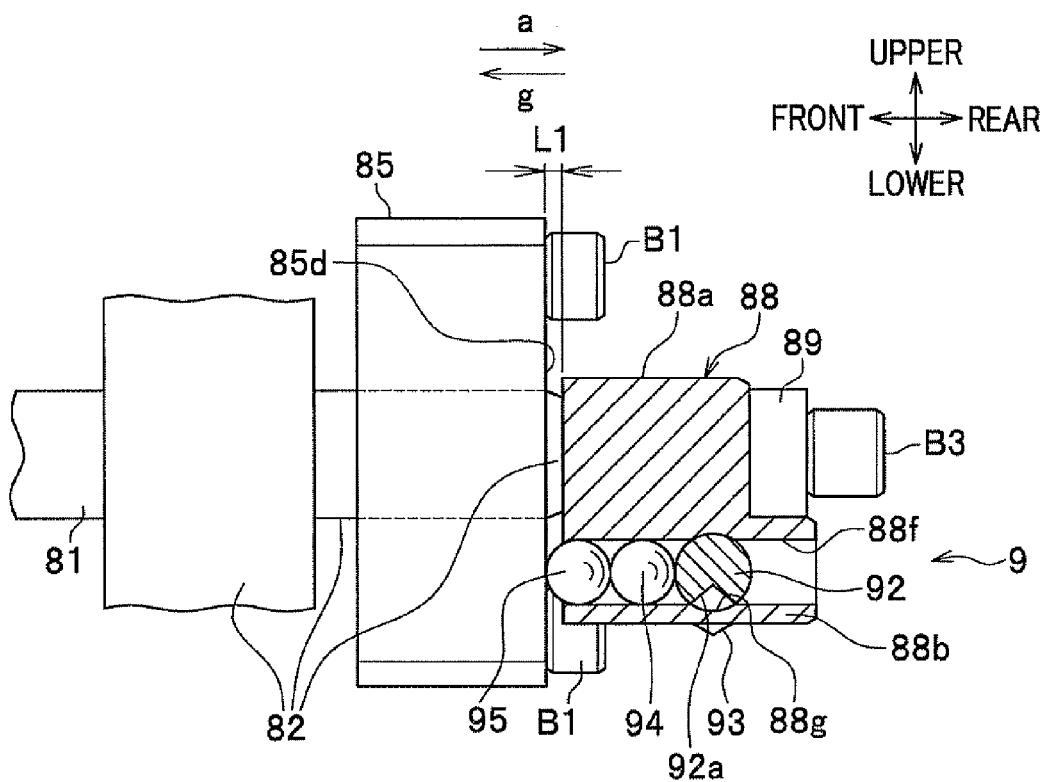

As shown in FIGS. 8A and 8B, the piston fixing bar 88 is a member in a thick plate shape which is formed horizontally long and substantially in an L-shape (stepped shape) in vertical cross-sectional view. The piston fixing bar 88 includes, for example, a fixing bolt installation portion 88a that is fixed on the rear end surface of the second piston 82 by a piston fixing bolt B2 (FIGS. 4 and 5) and a clamp lock mechanism installation portion 88b for installing the clamp lock mechanism 9.

Figure 6:
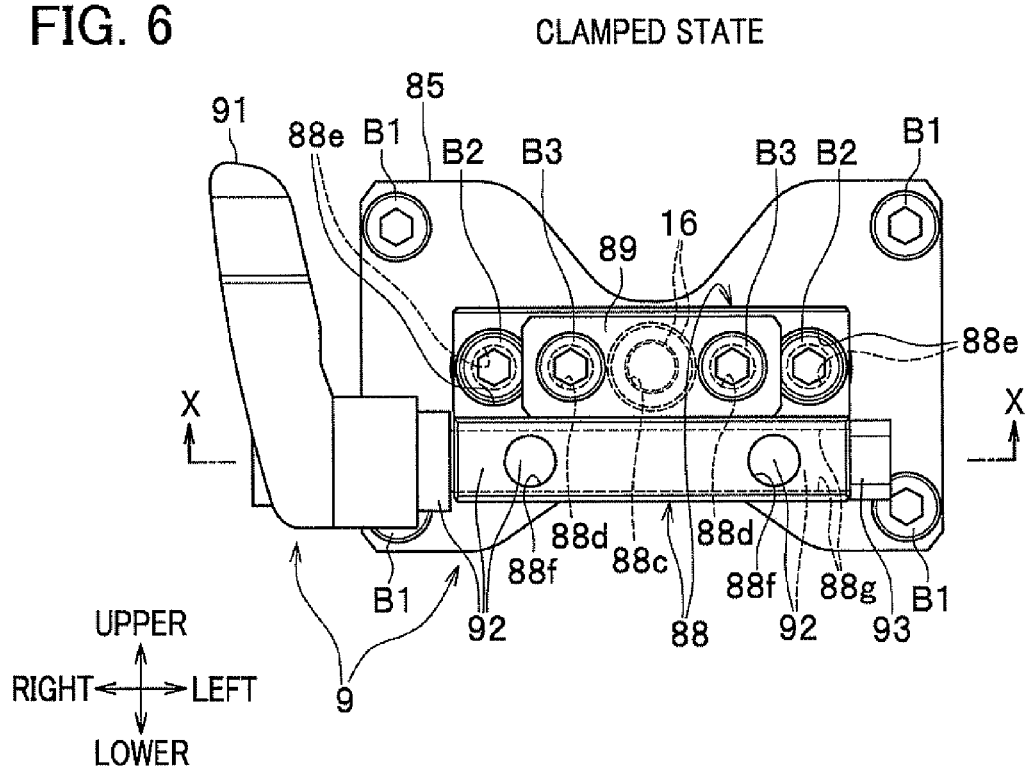
FIG. 6 is an enlarged rear view of a main part, showing the installation state of the lock lever of the clamp lock mechanism of the clamping device in the embodiment of the invention.

As shown in FIGS. 4 to 6, the fixing bolt installation portion 88a is, for example, a portion in a thick flat plate that is provided horizontally long at the upper portion of the piston fixing bar 88. The fixing bolt installation portion 88a is provided with at the central portion a bolt insertion hole 88c in which the head portion of the clamp bolt 16 is inserted, provided with on the left/right outer sides of the bolt insertion hole 88c internal thread portions 88d, 88d with which clamp bolt press-fixing bolts B3, B3 are thread-engaged, and further, provide with on the left/right outer sides of the internal thread portions 88d, 88d, bolt insertion holes 88e in which the head portions of piston fixing bolts B2, B2 are inserted.

Figure 7:
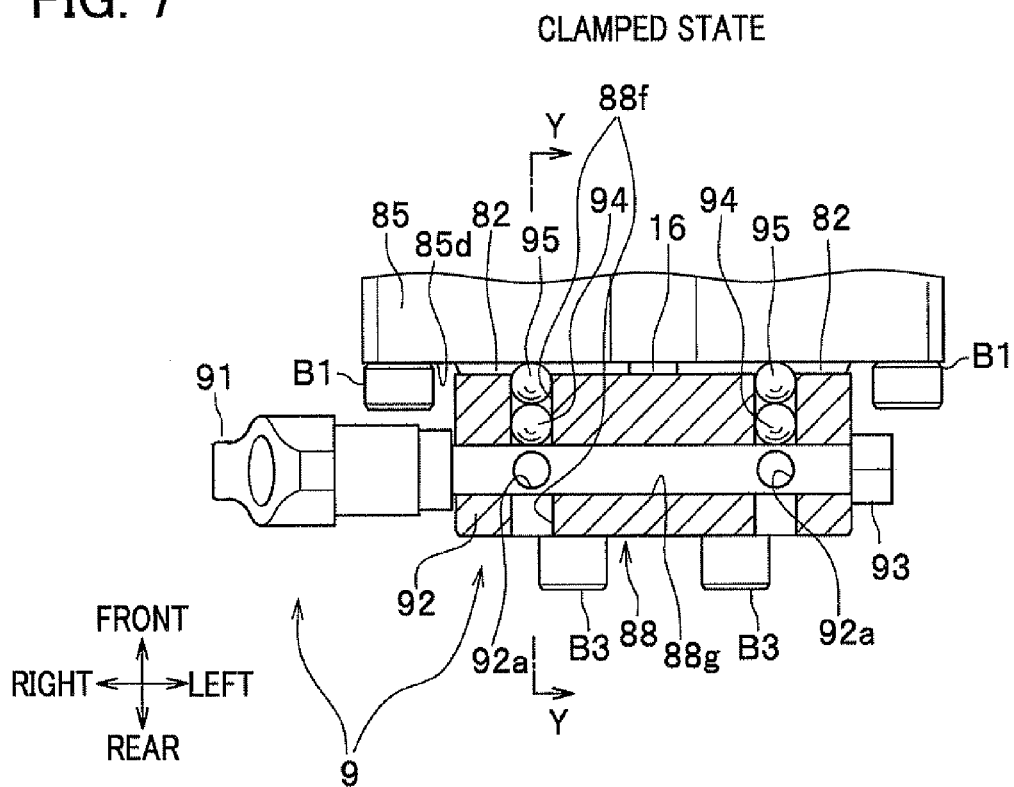
FIG. 7 is an X-X cross-sectional view related to FIG. 6 and is an enlarged rear view of the main part, showing the installation state of the lock lever of the clamp lock mechanism.

As shown in FIGS. 6 and 7, the clamp lock mechanism installation portion 88b is provided with steel ball insertion holes 88f, 88f in which left/right paired combinations of steel balls 94, 95 are inserted to be able to advance and retreat, and a lock lever installation hole 88g for insertion of a lock lever shaft 92, the lock lever installation hole 88g being formed horizontally and perpendicular to the left and right steel ball insertion holes 88f, 88f.

Structure of Clamp Bolt Presser

As shown in FIGS. 4 and 5, the clamp bolt presser 89 is a member for fixing the clamp bolt 16 to the fixing bolt installation portion 88a of the piston fixing bar 88, by covering the head portion of the clamp bolt 16 that is attached to the piston fixing bar 88 with the head portion thereof being put into the piston fixing bar 88, and by thread-engaging the left/right pair of clamp bolt press-fixing bolts B3 with the rear end surface of the piston fixing bar 88. The clamp bolt presser 89 is, for example, a thick plate member in a rectangular washer form, and is provided with holes through which the external thread portions of the left/right pair of the clamp bolt press-fixing bolts B3 penetrate.

As shown in FIG. 2, the cylinder plate fixing bolts B1 are connection tools that penetrate from the upper/lower/left/right end portions of the third cylinder plate 85 through this third cylinder plate 85 and the second cylinder plate 84, and the front ends thereof are thread-engaged with the first cylinder plate 83.

The piston fixing bolts B2 are fixing tools for fixing the left/right symmetrical third cylinder plate 85 to the piston fixing bar 88.

As described above, the left/right paired clamp bolt press-fixing bolts B3 are fixing tools for fixing the clamp bolt presser 89 to the rear end surface of the piston fixing bar 88, wherein the clamp bolt presser 89 covers the head portion of the clamp bolt 16, the head portion being in a state of being put in the fixing bolt installation portion 88a of the piston fixing bar 88.

The cylinder plate fixing bolts B1, the piston fixing bolts B2, and the clamp bolt press-fixing bolts B3 are, for example, cap bolts (hexagon socket head bolts).

Structure of Clamp Lock Mechanism

As shown in FIGS. 7, 8A, and 8B, the clamp lock mechanism 9 is a device that enables switch-driving of the clamping device 1A between the clamped state and the unclamped state by manual operation of the lock lever 91, and enables locking of the clamping device 1A into the clamped state or unlocking of the clamping device 1A into the unclamped state. In other words, the clamp lock mechanism 9 is a device for manually switching the clamping device 1A between the unclamped state, shown in FIG. 8A, and the clamped state, shown in FIG. 8B, by rotationally operating the lock lever 91 upward or backward to make the engagement recessions 92a of a lock lever shaft 92 engage with or separate from the steel balls 94, 95 so that the steel balls 95 do not press or press the surface 85d of the third cylinder plate 85, and moving thereby the piston fixing bar 88 fixing the second pistons 82 by the movement distance of the steel balls 94, 95.

That is, the clamp lock mechanism 9 is a safety device for manually making the clamped state into both a locked state and a further clamped state or into both an unlocked state and an unclamped state by rotational operation of the lock lever 91, thus advancing or retreating the left/right pair of the first piston 81 and the second piston 82 having advanced or retreated by compressed air and thereby advancing or retreating the clamp plate 14 which moves integrally with the bush 13 for expanding the diameter of the collet 11.

The clamp lock mechanism 9 includes the lock lever 91, the lock lever shaft 92, the steel balls 94, 95, the piston fixing bar 88, and the third cylinder plate 85.

As shown in FIGS. 1 and 2, the lock lever 91 is a rotational operation member substantially in an L-shape arranged on the right side surface of the piston fixing bar 88, and is arranged to rotate the lock lever shaft 92 around the axial line of the lock lever shaft 92 accompanying rotational operation of the lock lever 91. For example, during the unlocked state, the lock lever 91 is in a state of facing rearward, as shown in FIG. 4, and during the locked state, the lock lever 91 is rotated by 90 degrees, from the above-described state, to be in a state of facing upward (in the vertical direction), as shown in FIGS. 5, 6, 7, and 8B.

As shown in FIGS. 6 and 7, the lock lever shaft 92 is inserted in the lock lever installation hole 88g of the piston fixing bar 88, is thread-engaged at the external thread portion (not shown) formed at the end thereof with a lock lever fixing nut 93, and is thereby rotatable with respect to the piston fixing bar 88. The lock lever shaft 92 is provided with engagement recessions 92a, 92a at positions on a line perpendicular to the pair of steel ball insertion holes 88f, 88f, wherein the steel balls 94, 94 engage/separate with/from the engagement recessions 92a, 92a. The engagement recessions 92a are, for example, recessions in a conical shape with a recession diameter, at the opening edge, smaller than the diameter of the steel balls 94.

The lock lever shaft 92 is arranged such as to rotate integrally with the lock lever 91. In the unclamped state as a result of backward rotational operation of the lock lever 91, the engagement recessions 92a are facing forward, as shown in FIG. 8A, and the clamping device 1A is in the unlocked state in which the engagement recessions 92a engage with the steel balls 94. Through clamping by upward rotational operation of the lock lever 91, the engagement recessions 92a are rotated by 90 degrees from the above-described state and are facing downward, as shown in FIG. 8B, so that the clamping device 1A turns into the clamped state in which the outer surface of the lock lever shaft 92 and the steel balls 94 are in contact with each other, or into the locked state, making the clamped state, made by the piston cylinder device 8, to be the further clamped state.

As shown in FIGS. 8A and 8B, the steel balls 94, 95 are members inserted in the steel ball insertion holes 88f to be able to advance and retreat, and are respectively, for example, two metal spheres. In each of the steel ball insertion holes 88f, two steel balls 94, 95 are sandwiched between the lock lever shaft 92 and the third cylinder plate 85 and are in contact with each other, wherein the steel ball 94, which is on the side of the lock lever shaft 92, is always in contact with the lock lever shaft 92, and the steel ball 95, which is on the side of the third cylinder plate 85, is always in contact with the third cylinder plate 85.

That is, the piston fixing bar 88 provided with the lock lever shaft 92 is fixed to the second piston 82 by the piston fixing bolts B2, always in a state of being urged toward the first piston 81 (in the direction represented by arrow g) by the spring forces of the spring members SP. Accordingly, the lock lever shaft 92 has an urging force to press the steel balls 94 toward the third cylinder plate 85 (in the direction represented by arrow g) by the forces of the spring members SP.

As a result, during when the clamp device 1A is unclamped, as shown in FIG. 8A, the unclamped state that the steel balls 94 are engaged with the engagement recessions 92a of the lock lever shaft 92 by the spring forces of the spring members SP is maintained.

During when the clamp device 1A is clamped, as shown in FIG. 8B, accompanying the rotation of the lock lever shaft 92, the engagement recessions 92a separates from the positions of the respective steel balls 94, and the outer surface of the lock lever shaft 92 presses the third cylinder plate 85 through the steel balls 94, 95 against the spring forces of the spring members SP and moves the piston fixing bar 88 fixing the second pistons 82 backward (in the direction represented by arrow a) by a distance L1.

Thus, the clamp lock mechanism 9 is arranged such that, when the lock lever 91 is operated to rotate upward, the later-described collet 11 is locked to turn into the clamp state of being inserted inside the positioning hole Pa of the jig plate P, and when the lock lever 91 is operated to rotate backward, the collet 11 can be manually operated to turn into the unclamped state of being loosely fitted to the positioning hole Pa of the jig plate P.

Seal Member and Structure of Seal Member

As shown in FIG. 4, seal members O1, O2 are members for preventing leakage of compressed air, and arranged inside the first cylinder plate 83, the second cylinder plate 84, and the third cylinder plate 85.

Packings X are attached to the outer circumferential surfaces of the piston portions 81a, 82a of the first pistons 81 and the second pistons 82.

Structure of Clamp Bolt

The clamp bolt 16 (connecting rod) is a shaft in a bolt/nut shape extending forward/backward along the center line of the piston cylinder device 8, and is formed by a bolt portion and a clamp bolt fixing nut 16a. The clamp bolt 16 is supported inside the first cylinder plate 83, the second cylinder plate 84, and the third cylinder plate 85 to be able to advance and retreat along the axis direction thereof. The clamp bolt 16 is fixed to the clamp plate 14 at the front end thereof, and is fixed to the piston fixing bar 88 and the clamp bolt presser 89 at the rear end thereof, to integrally advance and retreat forward/backward.

Structure of Clamp Plate

The clamp plate 14 is a member in a thick plate shape. The clamp bolt 16 comes into the clamp plate 14 with thread engagement and the external thread portion at the front end thereof engages with a clamp bolt fixing nut 16a. Thus, the clamp plate 14 is connected with the clamp bolt 16 of the piston cylinder device 8 and advances and retreats integrally.

As shown in FIG. 3, at the clamp plate 14, there are provided the clamp bolt 16 attached at the upper portion of the clamp plate 14, lock bolts B4 attached to be able to advance and retreat at the left/right sides of the bottom portion of the clamp plate 14, a lock bar 15 and lock bar fixing nuts N1, and clamp plate connection tools 18 (see FIG. 9) connected with the bush 13 from the left/right sides of the clamp plate 14 through the clamp plate 14 and the nose piece 12. The lower half portion of the clamp plate 14 is externally fitted to the outer front end portion of the nose piece 12 to be able to advance and retreat.

Structures of Lock Bolt and Clank Plate Connection Tool

As shown in FIG. 3, the left/right pair of lock bolts B4 penetrate the clamp plate 14 and the lock bar 15 from the rear side of the first cylinder plate 83, wherein the space of the stroke in which the clamp plate 14 advances and retreats is between the first cylinder plate 83 and the clamp plate 14, and the lock bar fixing nuts N1 are thread engaged with the front end portions of the lock bolts B4. These lock bolts B4 are members having a function as a guide and support of the clamp plate 14 when the clamp plate 14 moves forward and backward, and a function in collaboration with the lock bar fixing nuts N1 to restrict the range of advance and retreat of the clamp plate 14. The lock bolts B4 are arranged, in front view, at the front lower left/right sides of the clamp plate 14.

Figure 9:
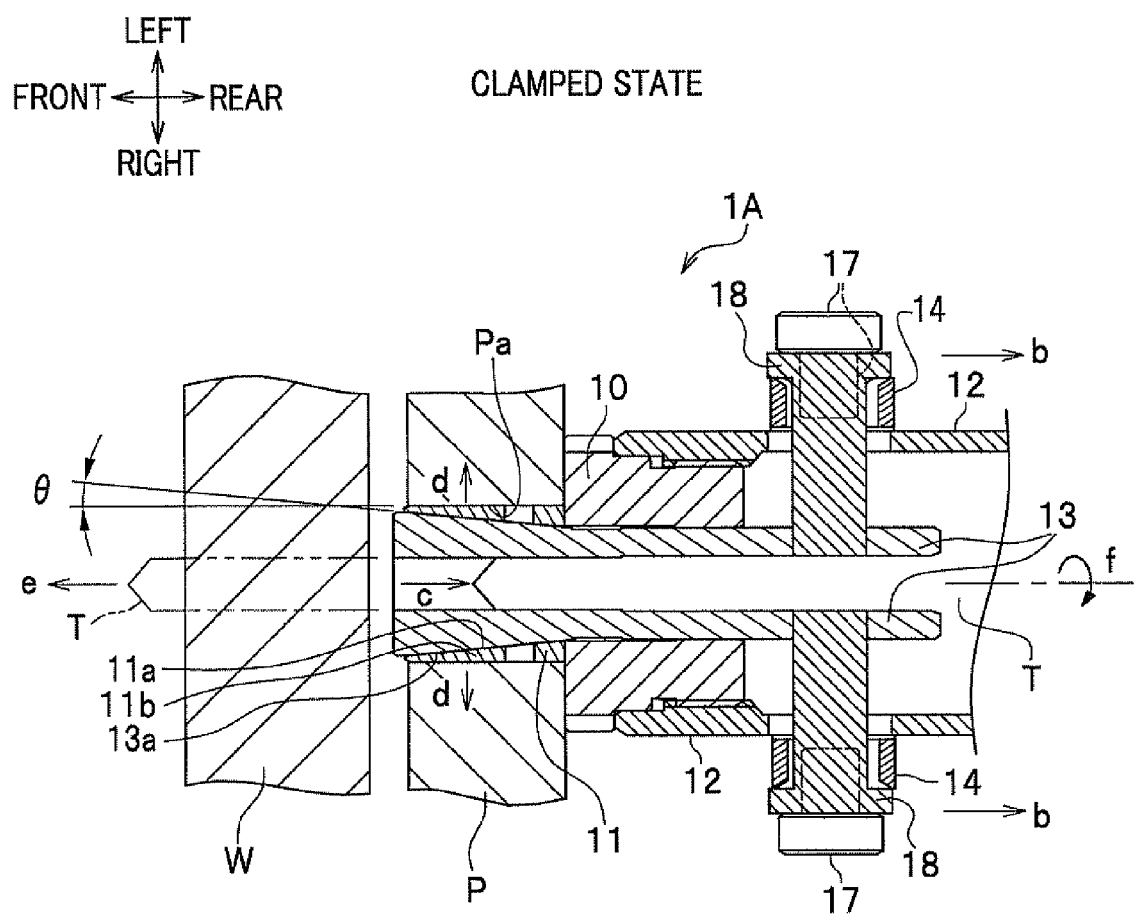
FIG. 9 is a horizontal enlarged cross-sectional view of the clamp portion of the clamping device in the embodiment of the invention.

As shown in FIG. 9, clamp-plate-connection-tool fixing bolts 17 are, for example, upper/lower pair of hexagon socket head bolts that are inserted from the left/right side surfaces of the clamp plate 14 respectively through a clamp plate connection tool 18.

The clamp plate connection tools 18 are pins for connecting the clamp plate 14 to the bush 13, and are respectively provided with protrusion portions forming the pin parts thereof, flat shaped head portions serving also as washers of the clamp-plate-connection-tool fixing bolts 17, and a pair of insertion holes in which the pair of clamp-plate-connection-tool fixing bolts 17 are inserted. The clamp plate connection tools 18 are inserted in the bush 13 at the front ends thereof to connect the bush 13 and the clamp plate 14.

Structures of Rock Bar and Rock Bar Fixing Nut

As shown in FIG. 3, the lock bar 15 is a member arranged in a washer shape between the lock fixing nuts N1 and the clamp plate 14. The lock bar 15 is in a thick plate shape formed extending in the left/right direction, having a thickness and a strength larger than those of the lock fixing nuts N1. When the clamp plate 14 moves forward, the lock bar 15 restricts the forward movement of the clamp plate 14, blocking the clamp plate 14, so that the clamp plate 14 advances and retreats within a predetermined stroke with restriction by collaboration between the lock bar 15 and the lock bar fixing nuts N1, which are thread engaged with the lock bolts B4.

The lock bolts B4 pass through the first cylinder plate 83, gap, and the clamp plate 14, and penetrate with thread engagement through the lock bar 15 to be fixed by the lock bar fixing nuts N1. By adjusting the position of the thread engagement of the lock bar fixing nuts N1, the position of the clamp plate 14 can be adjusted.

For the lock bar fixing nuts N1, double nuts (lock mechanism) are arranged to prevent deviation of the position adjustment of the clamp plate 14.

The shapes and the like of lock bar 15 and the lock bar fixing nuts N1 are not particularly limited, and any ones that can restrict the range of advance of the clamp plate 14 can be adopted.

Structure of Bush

The bush 13 is a member substantially in a cylindrical shape, and advances and retreats in the forward/backward direction together with the clamp plate 14, which is advanced and retreated by the piston cylinder device 8. The drill T is inserted in the bush 13 such as to be able to advance and retreat, and the bush 13 has a function to define the position of the drill T with respect to the processing object W. The bush 13 is provided with a tapered portion 13a with which the tapered portion 11a of the collet 11 slidably contacts.

The tapered portion 13a is formed at the front end portion of the bush 13 such as to become larger in diameter toward the front side. The collet 11 is externally fitted to the tapered portion 13a from the tapered portion 13a to the central rear side, wherein the tapered portion 11a of the collet 11 is externally fitted to the tapered portion 13a, the tapered portion 11a being formed on the inner circumferential portion of the collet 11 such as to become larger toward the front end side. When the bush 13 retreats (moves in the direction represented by arrow c), the tapered portion 11a of the collet 11 is pressed by the tapered portion 13a of the bush 13 toward the circumference (in the direction represented by arrow d) so that the outer circumferential surface of the collet 11 is press-fitted to the positioning hole Pa of the jig plate P, and the bush 13 is held in a state that the position thereof is defined by the jig plate P through the collet 11. The gradient angle θ of the tapered portions 11a and 13a is approximately 5 to 8 degrees. The gradient angle θ is formed by a predetermined dimension that is set in advance, depending on the thickness of the jig plate P, the inner diameter of the positioning hole Pa, the processing diameter, and the processing thrust force. Accordingly, the gradient angle θ is formed, matching a request, as appropriate.

Structures of Collet and Drill

As shown in FIG. 9, the collet 11 is a member to be engaged with the positioning hole Pa of the jig plate P for defining the position of the drill T (hole drilling tool) that drills a hole through the processing object W. When the bush 13 retreats, the diameter of the collet 11 is expanded by the tapered portion 13a, and the collet 11 is engaged with the positioning hole Pa such as to press the inner wall of the positioning hole Pa. The collet 11 is provided with a plurality of slits 11b for easy elastic deformation of the collet 11 in the radial direction, and provided with the tapered portion 11a to which the bush 13 is internally fitted.

The slits 11b are provided with plural notched cuts formed in the forward/backward direction from the front end portion to the vicinity of the rear end portion of the collet 11, and with plural notched cuts formed in the forward/backward direction from the rear end portion to the vicinity of the front of end portion of the collet 11, wherein the former notched cuts and the latter notched cuts are formed in a plural number at appropriate intervals from both front/rear directions with alternate facing directions. The slits 11b are thereby elastic to be expanded in the diameter.

When the bush 13 movably and internally fitted to the tapered portion 11a advances or retreats, the tapered portion 11a is pressed by the tapered portion 13a of the bush 13 to be expanded in the diameter thereof, and the outer circumferential surface of the collet 11 press-contacts with the positioning hole Pa of the jig plate P.

As shown in FIGS. 3 and 9, the drill T is a tool for processing the processing object W, and advances and retreats by an advance and retreat mechanism 6, while rotating by the main shaft motor M.

Operation

Figure 10:
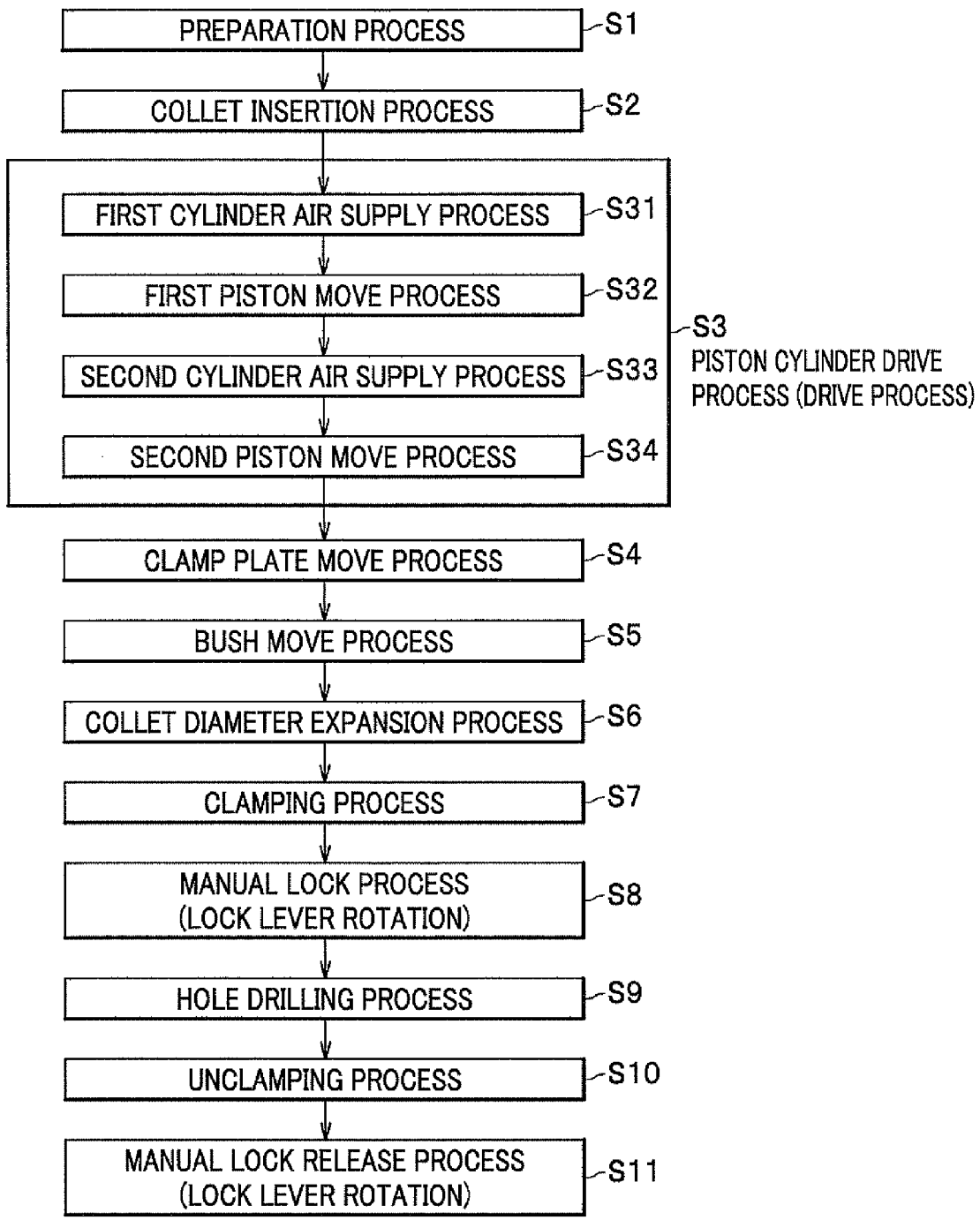
FIG. 10 is a flowchart showing a clamping method and a hole drilling method in the embodiment of the invention.

The operation of the clamping device 1A structured as has been described above and related to the present embodiment will be described below with reference to the respective figures, mainly FIG. 10, according to the order of hole drilling works by the hole drilling apparatus 1. First, operation for clamping in which the collet 11 of the clamping device 1A holds the jig plate P will be described.

Description of Clamping

As shown in FIG. 2, in case of drilling a hole through the processing object W by the hole drilling apparatus 1, as a preparation process (step S1), the position of the jig plate P is defined with respect to the processing object W, matching the hole to be drilled through the processing object W. Then, a collet insertion process for inserting the collet 11 at the front end of the hole drilling apparatus 1 into the positioning hole Pa of the jig plate P is performed (step S2).

Then, a clamp switch SW provided at the rear end portion of the hole drilling apparatus 1 is turned ON to perform a piston cylinder drive process (drive process (step S3)) for driving the air supply source (not shown) and the piston cylinder device 8.

This piston cylinder drive process is specifically corresponding to later-described steps S31 to S34. First, a first cylinder air supply process (step S31) is performed to supply compressed air from the air supply source through the air flow paths L, the air supply flow paths 71, and the supply inlets 83c, shown in FIG. 4, into the first cylinders 8Aa. Then, performed is a first piston move process (step S32) in which the first pistons 81 are pressed by the compressed air to retreat (move in the direction represented by arrow a).

The compressed air supplied in the first cylinders 8Aa is supplied through inside the piston cylinder device 8 to the second cylinder 8Ba side (a second cylinder air supply process (step S33)). Then, performed is a second piston move process (step S34) in which the second pistons 82 are pressed by the compressed air to retreat (move in the direction represented by arrow a).

Then, performed is a clamp plate move process (step S4) in which, accompanying the retreat of the first pistons 81 and the second pistons 82, the clamp plate 14 retreats (moves in the direction represented by arrow b), being pulled backward with interposition of the piston fixing bar 88 fixed to the second pistons 82 and the clamp bolt 16.

Simultaneously, performed is a bush move process (step S5) in which, as shown in FIG. 3, accompanying the retreat of the clamp plate 14, the bush 13 integrally retreats (move in the direction represented by arrow c). In this situation, the clamp plate 14 is pulled backward at the top end portion thereof by the clamp bolt 16, and the principle of leverage thereby acts wherein the lower end portion of the clamp plate 14 presses the lock bar 15 forward. Accordingly, as shown in FIG. 9, the pulling force, which pulls the clamp-plate-connection-tool fixing bolts 17 backward (the direction represented by arrow b), acts to pull the bush 13 backward, becoming larger than the pulling force that pulls the clamp bolt 16 (see FIG. 3) backward (in the direction represented by arrow b).

Then, performed is a collet diameter expansion process (step S6) for expanding the diameter of the collet 11 such that, when the bush 13 retreats by this pulling force, the tapered portion 13a of the bush 13 presses the tapered portion 11a of the collet 11 toward the outer circumference (in the direction represented by arrow d) to expand the diameter of the collet 11 inside the positioning hole Pa of the jig plate P.

Then, performed is a clamping process (step S7) in which, as the diameter of the collet 11 has been expanded, the outer circumferential surface of the collet 11 presses the inner wall of the positioning hole Pa so that the front end portion of the hole drilling apparatus 1 is fixed at a predetermined position of the jig plate P.

As the jig plate P is connected with the processing object W in a state that the position thereof is defined with respect to the processing object W, the collet 11 at the front end of the hole drilling apparatus 1 is also fixed in a state that the position thereof is defined with respect to the processing object W.

Further, the lock lever 91 is rotated upward by operation to manually lock the collet 11 into a clamped state that the collet 11 is fitted to the inside of the positioning hole Pa of the jig plate P (step S8).

When the lock lever 91 is rotated upward by operation, as shown in FIG. 8B, the engagement recessions 92a of the lock lever shaft 92 separate from the steel balls 94, and the outer surface of the lock lever shaft 92 presses the third cylinder plate 85 through the steel balls 94, 95 against the spring forces of the spring member SP so that the piston fixing bar 88 moves backward (in the direction represented by arrow a) to the lock position.

Consequently, the clamp lock mechanism 9 locks the clamped state of the collet 11 to be able to prevent the collet 11 from separating from the jig plate P.

Then, when the manual start button of the hole drilling apparatus 1 is pressed, performed is a hole drilling process (step S9) in which the drill T (hole drilling tool) advances while the main shaft motor M rotationally drives to start processing, and a hole is drilled through the processing object W by the drill T.

This clamped state of the clamping device 1A can be obtained by the clamp lock mechanism 9 without using compressed air, and further, the clamping device 1A can be locked in this clamped state by the clamp lock mechanism 9.

For example, the lock lever 91 in a state of being backward for unclamping, as shown in FIG. 4, is operated into the state of being upward for clamping, as shown in FIGS. 6 to 8. Then, the steel balls 94 having been, as shown in FIG. 8A, engaged with the engagement recessions 92a of the lock lever shaft 92 move and separate from the engagement recessions 92a, as shown in FIG. 8B, by the downward rotation of the lock lever shaft 92 by 90 degrees to come in contact with the outer surface of the lock lever shaft 92. The steel balls 95 are pressed and moved by the steel balls 94 having separated from the engagement recessions 92a, and thereby press and move the third cylinder plate 85 toward the second pistons 82 (in the direction represented by arrow g) by the distance L1 with respect to the lock lever shaft 92 and the piston fixing bar 88.

In such a manner, the piston fixing bar 88 and the second pistons 82 fixed to the piston fixing bar 88 is locked in the clamped state (the state in the clamp process in step S7) in which the second piston 82 has moved toward the third cylinder plate 85 (in the direction represented by arrow a) by the distance L1 with respect to the third cylinder plate 85.

That is, the clamped state is maintained by operation of rotating the lock lever 91 of the clamp lock mechanism 9 in the locking direction (upward). Thus, the collet 11 is locked in a state of being inserted inside the positioning hole Pa of the jig plate P, and it is thereby possible to solve the problem that the collet 11 drops from the jig plate P during when the clamping device 1A is in operation.

Description of Unclamping

When the drilling processing has been completed, the clamp switch SW is tuned OFF to stop the supply of compressed air having been supplied from the compressed air supply source (not shown) into the piston cylinder device 8 (unclamping process (step S10)).

Subsequently, manual lock is released by operation of rotating the lock lever 91 backward so that the steel balls 94 come into the engagement recessions 92a of the lock lever shaft 92, and the collet 11 is thereby turned into the unclamped state (a manual lock release process (step S10)). Thus, the collet 11 is released from the clamped state to be able to separate from the jig plate P.

In this manual lock release process (step S10), as both the piston cylinder device 8 and the manual clamp lock mechanism 9 are in the unclamped state, the first pistons 81 and the second pistons 82 are pressed back to the position of the unclamp in the forward direction by the spring forces of the spring members SP.

Accompanying movement of the first pistons 81 and the second pistons 82, the clamp plate 14 also advances with interposition of the piston fixing bar 88 and the clamp bolt 16. Further, as the bush 13 advances integrally with the clamp plate 14, the collet 11 having been in an expanded state shrinks in diameter to turn into the unclamped state.

Then, when the hole drilling apparatus 1 is pulled backward and the collet 11 is removed from the positioning hole Pa of the jig plate P, the drilling operation is completed.

Modified Example

The present invention is not limited to the foregoing embodiment, and various changed and modifications can be made within the spirit of the intention. It is needless to say that the invention also covers such changed and modified embodiments. The same symbols will be assigned to the elements described above, and the description of details of these elements will be omitted below.

Figure 11:
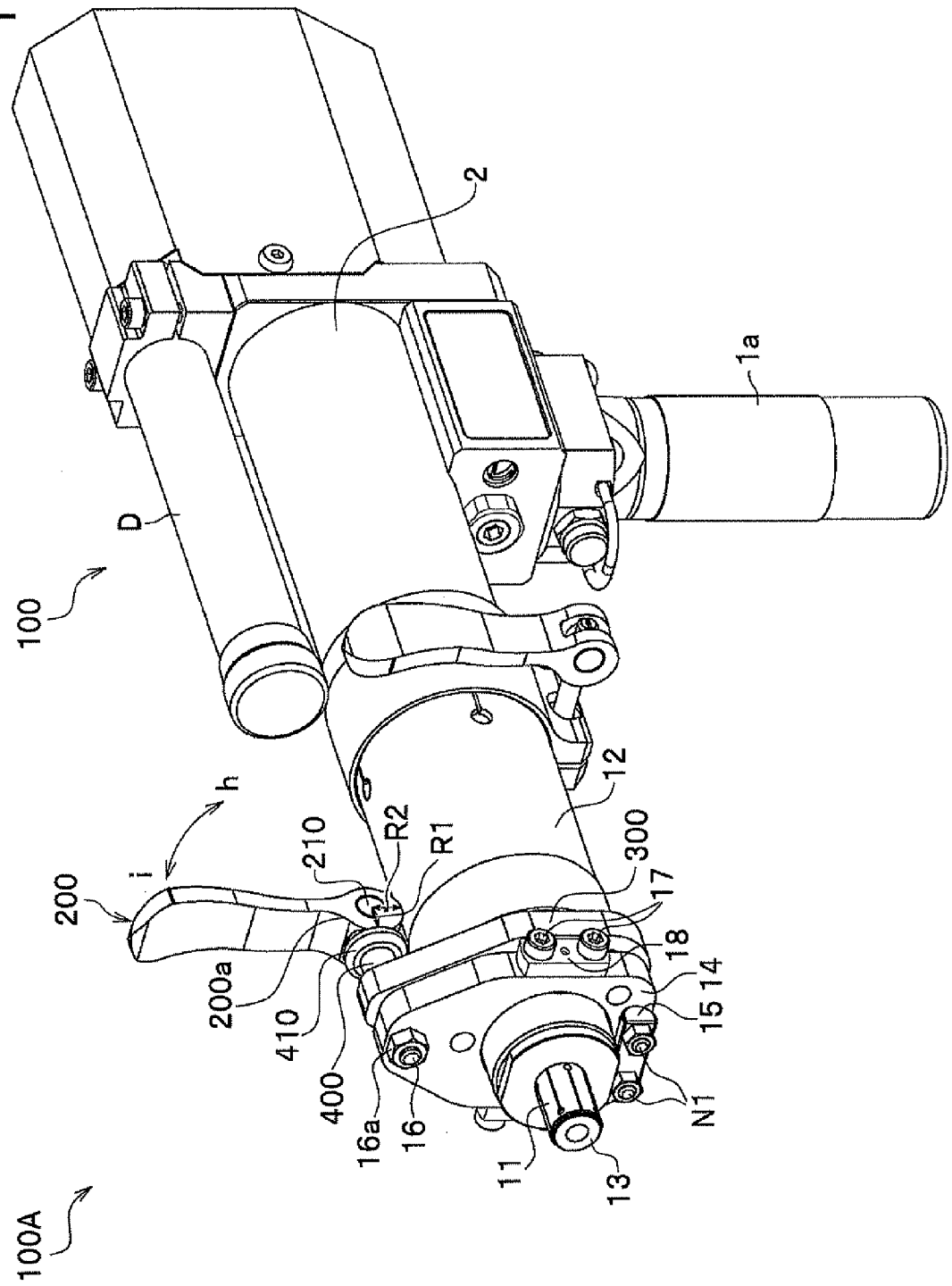
FIG. 11 is a perspective view showing a modified example of a hole drilling apparatus having the clamping device in the embodiment of the invention.
Figure 12:
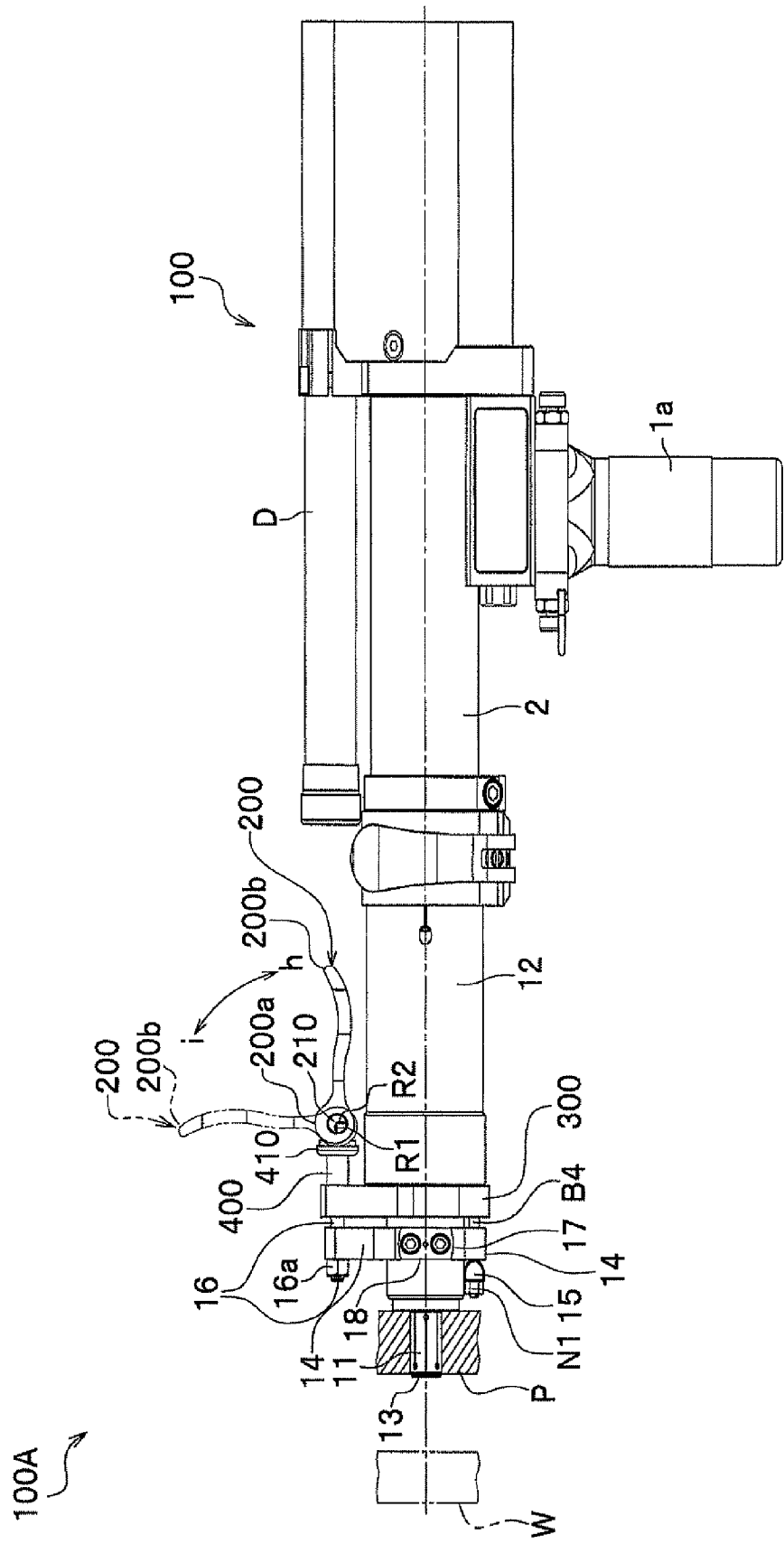
FIG. 12 is a side view showing the modified example of the hole drilling apparatus having the clamping device in the embodiment of the invention.

FIG. 11 is a perspective view showing a modified example of a hole drilling apparatus having a clamping device in another embodiment of the invention. FIG. 12 is a side view showing the modified example of the hole drilling apparatus having the clamping device in the present embodiment of the invention.

In the foregoing embodiment, as shown in FIG. 3, the hole drilling apparatus 1 has been described such that the hole drilling apparatus 1 is provided with the clamping device 1A which advances and retreats the clamp plate 14 and the bush 13 by the piston cylinder device 8 driven by compressed air and thereby expands/reduces the diameter of the collet 11. However, the invention is not limited thereto.

That is, the hole drilling apparatus 1 is not limited to one that is provided with the clamping device 1A (clamp plate drive unit 80A) on which the clamp plate 14 is mechanically driven by the piston cylinder device, and a clamping device 100A (clamp plate drive unit 80B) which is manually driven may be employed.

As shown in FIGS. 11 and 12, in this case, the clamping device 100A (clamp plate drive unit 80B) of the hole drilling apparatus 100 is provided mainly with a clamp bolt 16 (connecting rod) whose one end portion is connected with the clamp plate 14, and a cam lever 200 rotatably connected at the other end of the clamp bolt 16.

When the cam lever 200 disposed at the unclamp position h is rotated manually by 90 degrees to the clamp position i by a worker, the clamping device 100A advances a bush 13 with the interposition of the clamp bolt 16 (connecting rod) and the clamp plate 14, and thereby expands the diameter of the collet 11. Then, when the cam lever 200 is returned to the original unclamp position h, the diameter of the collet 11 is reduced and the collet 11 returns to the unclamped state.

The base end portion of the cam lever 200 is fixed to one end of the clamp bolt 16 by a support shaft 210. A cam portion 200a is formed around the base end portion of the cam lever 200. Further, a grip portion 200b is formed on the front end side of the cam lever 200.

The cam portion 200a is arranged, for example, in a state that the cam portion 200a is always pressed in contact with the surface of a flange portion 410, which is integrally provided with a support plate 300, by a spring force for automatic return arranged between the clamp plate 14 and the support plate 300. The cam portion 200a is formed such that the radius R1 thereof at the position, where the cam portion 200a is in contact with the flange portion 410 when the cam lever 200 is positioned at the unclamp position h, is larger than the radius R2 thereof at the position, where the cam portion 200a is in contact with the flange portion 410 when the cam lever 200 is positioned at the clamp position i.

As the radius R2 of the cam portion 200a corresponding to the clamp position i of the cam lever 200 is smaller than the radius R1 of the cam portion 200a corresponding to the unclamp position h of the cam lever 200, the clamp bolt 16 (connecting rod) advances and retreats by the difference in the radius to move the clamp plate 14.

A cylindrical member 400 is fixed to the support plate 300 on the base end portion side thereof and is integrally provided with the flange portion 410 on the front end side thereof.

The support plate 300 is a member in a thick plate shape for supporting the cylindrical member 400 and the clamp bolt 16, and is fixed to the front end of the nose piece 12.

The clamp bolt 16 (connecting rod) is fixed to the clamp plate 14 at one end portion thereof by a clamp bolt fixing nut 16a and is fixed to the support axis 210 at the other end portion thereof, penetrating through the support plate 300, the cylindrical member 400, and the flange portion 410.

The hole drilling apparatus 100 with such a structure can be provided as a lightweight device with a simple structure, by having the manual type clamping device 100A. Further, the hole drilling apparatus 100 enables an operator to hold it by hand, and can be made easy for working.

Other Modified Example

Further, as the hole drilling apparatus 1 having reciprocally moving elements, one embodiment according to the invention has been described taking an example of a case of feeding the ram 3 of the drill unit, as shown in FIG. 1, however, the invention is not limited thereto. Any machine having reciprocally moving elements can be applied, and the hole drilling apparatus 1 may be a device different from the above-described example.

The hole drilling apparatus 1 can be any machine that is provided with reciprocally moving elements, such as the ram 3 and the like, or a machine that has the ram 3 mounted thereon wherein the ram 3 reciprocally moves objects, such as a tool, a processing object, and the like. It is not particularly limited as to what operates the reciprocally moving ram 3 and what the hole drilling apparatus 1 is used for.

That is, the main shaft motor M can be any one that rotates the ram 3, the holding unit 5, and the drill T, and may be, for example, a hydraulic motor, an electric motor, or the like.

Further, the advance and retreat mechanism 6 can be any device that advances and retreats the ram 3, the holding unit 5, and the drill T, and may be a device using a different mechanism, such as a hydraulic cylinder mechanism, a motor gear mechanism, or the like.

Still further, in the foregoing embodiment, description has been made on a case of supplying compressed air through the hollow portions 81c of the first pistons 81 into the second cylinders 8Ba to advance and retreat the second pistons 82. However, instead of supplying the compressed air through the first pistons 81 and the first cylinders 8Aa, it is also possible to supply the compresses air directly from the compressed air support source side into the second cylinders 8Ba to drive the second pistons 82.

In the foregoing embodiment, as an example of a tool, description has been made taking an example of the drill T, however, any rotation tool, such as a tap, a reamer, an end mill, or the like that is rotated and reciprocally moved to process a processing object W can be applied.

Further, in the foregoing embodiment, as an example of the hole drilling apparatus 1, description has been made on a case of arranging spring members SP for press-returning the first pistons 81 and the second pistons 82 to the front side, and thereby driving the piston cylinder device 8 to retreat the bush 13 so that the diameter of the collet 11 is expanded, however a reverse case may be applied.

That is, the hole drilling apparatus 1 may be arranged such that the spring members SP are arranged on the rear side of the first pistons 81 and the second pistons 82 for clamping by the spring forces of the spring members SP, and the bush 13 advances by the piston cylinder device 8 with supplied compressed air to reduce the diameter of the collet 11 for unclamping.

Further, description has been made, taking an example in which each pair of two steel balls 94, 95 is formed by two spherical members, however, a single push rod may be employed instead.

In this case, the whole length of the push rod is made the same of the length of the two steel balls 94, 95, and the surface of the push rod on the lock lever shaft 92 side is formed to be a spherical surface that is the same as the steel ball 94. A push rod in such a shape has the same operational effects as those of the steel balls 94, 95.

What is claimed is:

1. A clamping device that defines a position of a hole drilling tool attached to a machining shaft of a hole drilling apparatus for drilling a hole through a processing object, the position being defined at a positioning hole formed through a jig plate, the clamping device comprising:
    a cylindrical nose piece that covers a front portion of the hole drilling apparatus;
    a clamp plate attached to an outer front end portion of the cylindrical nose piece to be able to advance and retreat along the machining shaft;
    a clamp plate drive unit for advancing and retreating the clamp plate that is arranged on the outer front end portion of the cylindrical nose piece;
    a connecting rod supporting the clamp plate and the clamp plate drive unit, the connecting rod being arranged to be offset parallel to the machining shaft;
    a bush having a cylindrical shape and a tapered portion, the tapered portion having a diameter that is expanded to be larger on a front side than on a rear side, the bush being arranged at the clamp plate such as to rotatably support the hole drilling tool; and
    a collet having a tapered portion, the tapered portion having a diameter that is reduced to be smaller on a rear end side than on a front end side, the collet suiting the tapered portion of the bush and being fixed to the front end portion of the hole drilling apparatus and being inserted into the positioning hole;
wherein the clamp plate drive unit includes a piston cylinder device along the connecting rod;
wherein the position of the hole drilling tool is clamped at the positioning hole by the clamp plate drive unit retreating the bush to engage the tapered portion of the bush with the tapered portion of the collet;
wherein the hole drilling tool extends through the bush and the collet; and
wherein the connecting rod has one end portion that is connected with the clamp plate, and a cam lever rotatably connected with another end portion of the connecting rod, the cam lever being rotationally operated to advance and retreat the bush through the connecting rod and the clamp plate.

* * * * *